(12) United States Patent
Franceschini et al.

(10) Patent No.: US 11,965,599 B2
(45) Date of Patent: Apr. 23, 2024

(54) BRUSH SEAL

(71) Applicant: ROLLS-ROYCE plc, London (GB)

(72) Inventors: Gervas Franceschini, Derby (GB); Maciej T. Pietrzak, Nottingham (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 18/165,642

(22) Filed: Feb. 7, 2023

(65) Prior Publication Data

US 2023/0287979 A1    Sep. 14, 2023

(30) Foreign Application Priority Data

Mar. 4, 2022 (GB) ..................................... 2203012

(51) Int. Cl.
*F16J 15/3288* (2016.01)
*F01D 11/00* (2006.01)

(52) U.S. Cl.
CPC ........... *F16J 15/3288* (2013.01); *F01D 11/00* (2013.01); *F05D 2240/56* (2013.01)

(58) Field of Classification Search
CPC .... F16J 15/3288; F01D 11/00; F05D 2240/56
See application file for complete search history.

(56) References Cited

U.S. PATENT DOCUMENTS

| | | | |
|---|---|---|---|
| 2,860,015 A | 11/1958 | Matterson | |
| 3,385,624 A | 5/1968 | Baclini | |
| 4,035,044 A | 7/1977 | Miyazaki | |
| RE30,206 E | 2/1980 | Ferguson et al. | |
| 4,548,546 A | 10/1985 | Lardellier | |
| 5,176,389 A * | 1/1993 | Noone | F16J 15/3288 277/355 |

(Continued)

FOREIGN PATENT DOCUMENTS

| | | |
|---|---|---|
| EP | 0778431 B1 | 9/2001 |
| EP | 3620696 A1 | 3/2020 |

(Continued)

OTHER PUBLICATIONS

Great Britain search report dated Sep. 5, 2022, issued in GB Patent Application No. 2203012.6.

(Continued)

*Primary Examiner* — Hoang M Nguyen
(74) *Attorney, Agent, or Firm* — Barnes & Thornburg LLP

(57) ABSTRACT

A brush seal includes an annular plate assembly defining a radially inner diameter having an inner central axis and a radially outer diameter having an outer central axis. The inner central axis and the outer central axis are spaced apart from each other by an offset, such that the radially inner diameter and the radially outer diameter are eccentric with respect to each other. The brush seal further includes a bristle pack. The bristle pack includes a plurality of bristles defining a bristle bore having a bristle bore central axis. The bristle bore central axis is aligned with the inner central axis and the bristle bore central axis is offset from the outer central axis. Moreover, the brush seal is disposed around a rotating component. The bristle bore central axis is aligned with a component axis of the rotating component and the bristle pack engages with the rotating component.

15 Claims, 14 Drawing Sheets

(56) References Cited

U.S. PATENT DOCUMENTS

| | | | |
|---|---|---|---|
| 5,480,162 A * | 1/1996 | Beeman, Jr. | F01D 9/023 |
| | | | 277/355 |
| 6,173,962 B1 | 1/2001 | Morrison et al. | |
| 2003/0042682 A1 * | 3/2003 | Inoue | F16J 15/3292 |
| | | | 277/355 |
| 2009/0110545 A1 | 4/2009 | Davis et al. | |
| 2013/0017082 A1 | 1/2013 | Casavant | |
| 2013/0256992 A1 | 10/2013 | Zheng et al. | |
| 2014/0341722 A1 | 11/2014 | Belmonte et al. | |
| 2015/0345640 A1 * | 12/2015 | Inoue | F01D 11/003 |
| | | | 277/355 |

FOREIGN PATENT DOCUMENTS

| | | | |
|---|---|---|---|
| GB | 1450553 A | 9/1976 | |
| GB | 1598926 A | 9/1981 | |
| GB | 2304158 A | 3/1997 | |
| GB | 2500793 B | 9/2014 | |

OTHER PUBLICATIONS

Extended European Search Report, dated Jul. 28, 2023, pp. 1-5, issued in European Application No. 23155021.1, European Patent Office, Munich, Germany.

* cited by examiner

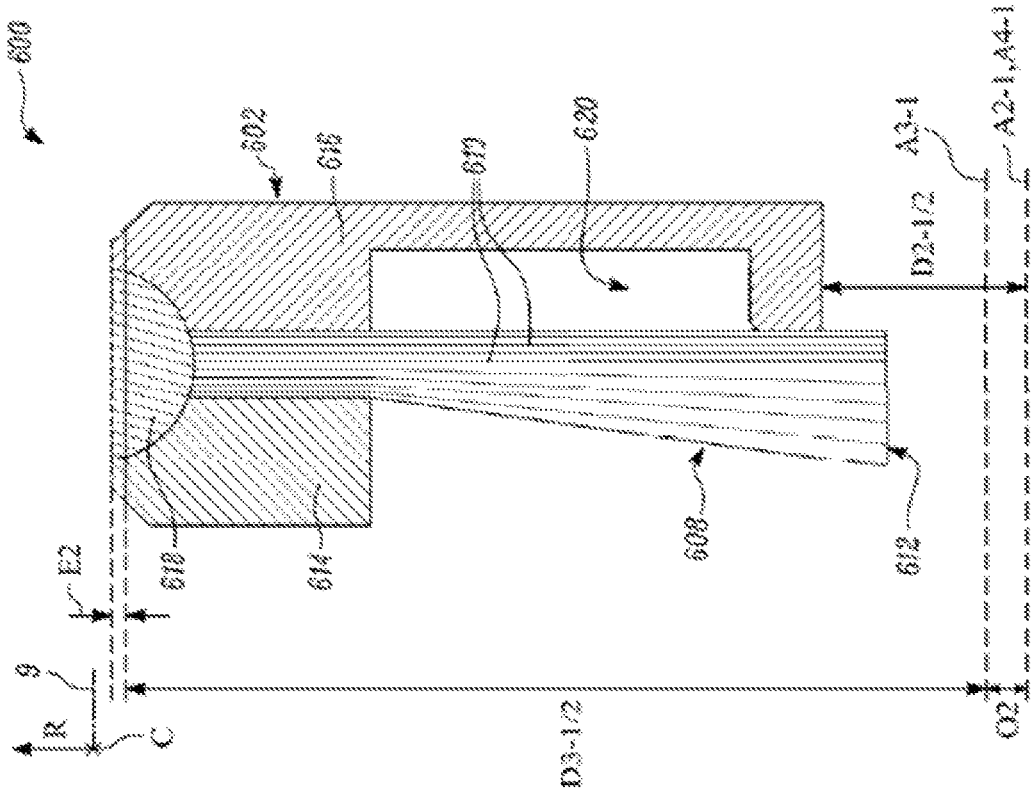
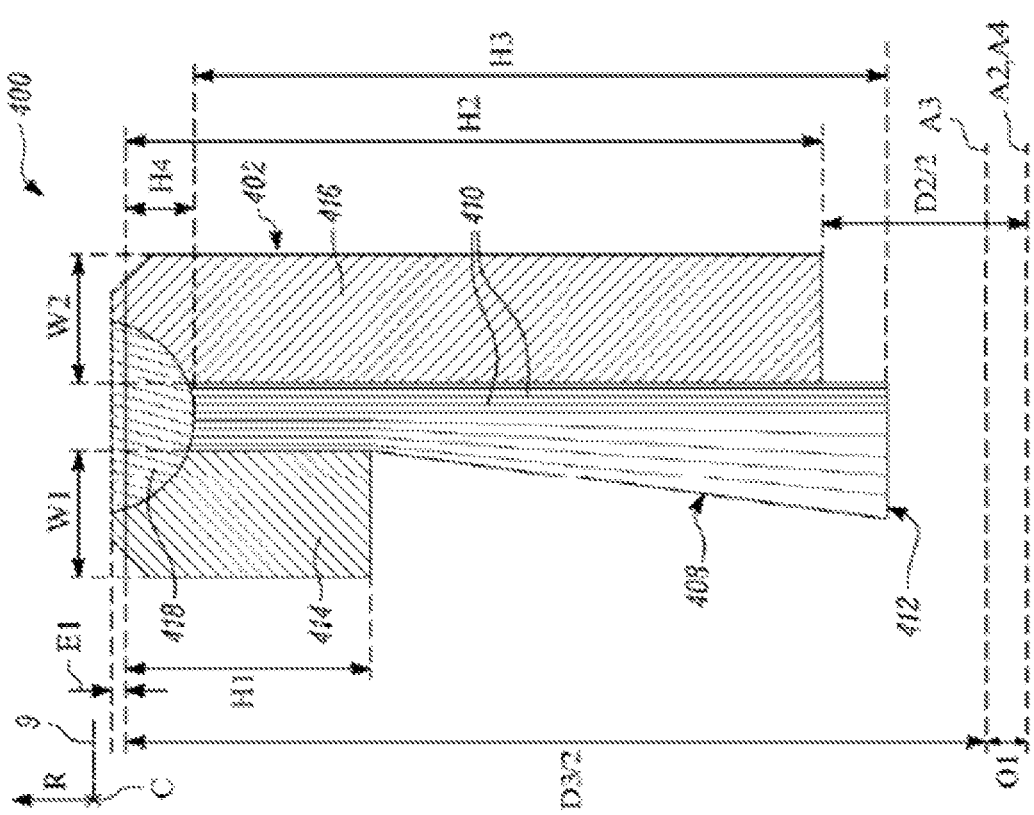
FIG. 6B
FIG. 6A

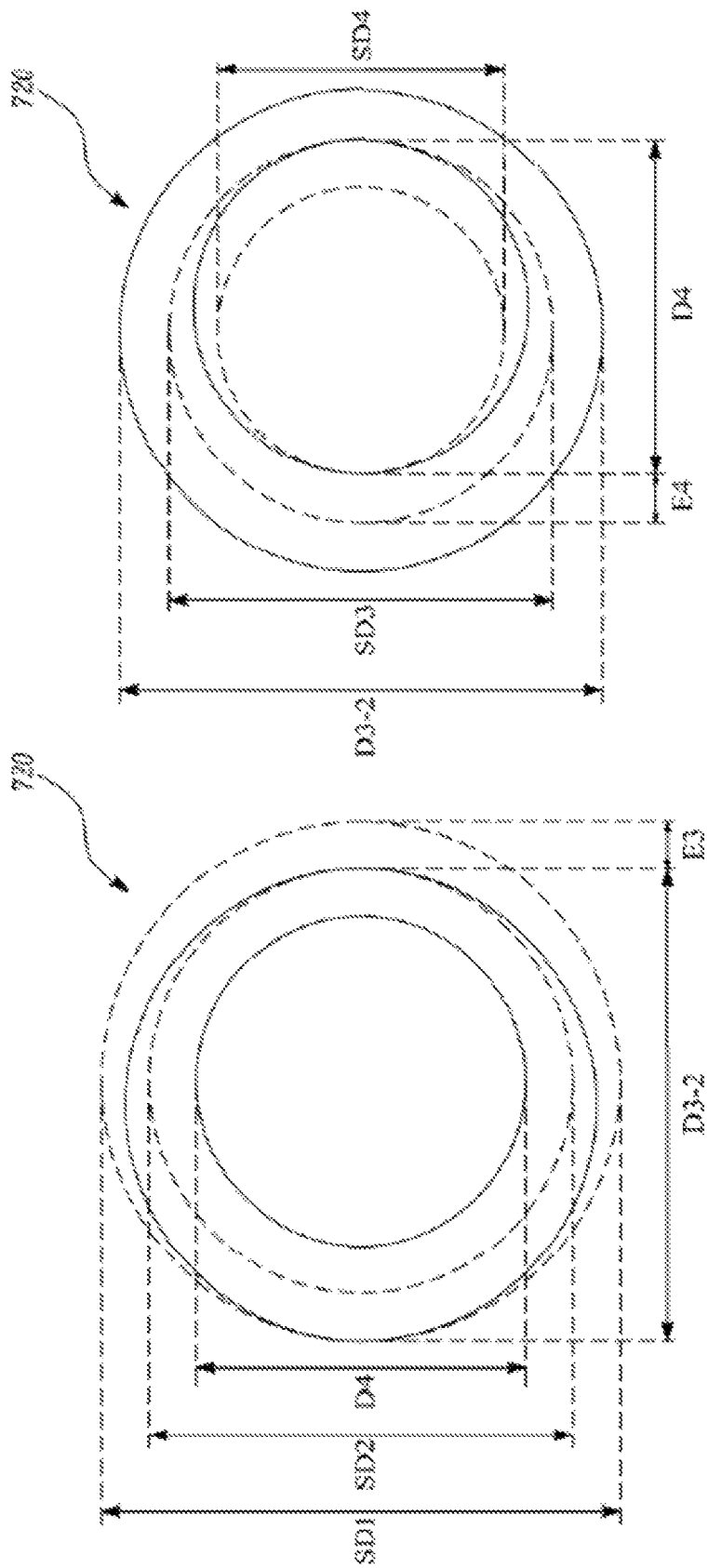

BRUSH SEAL

CROSS-REFERENCE TO RELATED APPLICATIONS

This specification is based upon and claims the benefit of priority from United Kingdom patent application number GB 2203012.6 filed on Mar. 4, 2022, the entire contents of which is incorporated herein by reference.

BACKGROUND

Technical Field

The present disclosure generally relates to a brush seal and a gas turbine engine including the brush seal. The present disclosure also relates to a method of manufacturing the brush seal and a method of installing the brush seal.

Description of the Related Art

A brush seal is generally used to establish a fluid seal between relatively movable components. The brush seal may be disposed between two components of a rotating machine, such as, a gas turbine engine, a steam engine, or a jet engine. The brush seal typically includes one or more plates and a bristle pack coupled to the one or more plates. The bristle pack includes a number of bristles. The bristles of the brush seal may be in a sliding relationship with a rotating component, such as, a rotor of the rotating machine.

In some cases, when the brush seal is installed around the rotating component, a radial offset may be present between a central axis defined by the bristle pack and an axis of the rotating component. In other words, a bore defined by the bristles may be eccentric relative to an outer diameter of the rotating component. Such an eccentricity may be due to a combination of manufacturing tolerances or assembly tolerances, such as, bearing tolerances. If the brush seal is designed to operate with the radial offset, a non-uniform circumferential clearance may be present between the bristles and the rotating component. More particularly, there may be a region of increased interference between the bristles and the rotating component and in an opposite direction there may be an increased circumferential clearance between the bristles and the rotating component. Due to the increased circumferential clearance, an increased fluid leakage through the increased circumferential clearance may be observed. Further, the increased fluid leakage may in turn increase internal losses, increase fuel consumption, and lower a thermal efficiency of the rotating machine.

Moreover, the increased interference between the bristles and the rotating component may lead to an increased heat generation due to higher contact pressure and higher frictional torque. The increased heat generation may cause local thermal growth of the bristles and the rotating component, leading to a further increase in the contact pressure. This phenomenon may ultimately lead to instability of the rotating component and a failure of the rotating machine.

SUMMARY

In a first aspect, there is provided a brush seal. The brush seal includes an annular plate assembly defining a radially inner diameter having an inner central axis and a radially outer diameter having an outer central axis. The inner central axis and the outer central axis are spaced apart from each other by an offset, such that the radially inner diameter and the radially outer diameter are eccentric with respect to each other. The brush seal further includes a bristle pack coupled to the annular plate assembly. The bristle pack includes a plurality of bristles. The plurality of bristles define a bristle bore having a bristle bore central axis. The bristle bore central axis is aligned with the inner central axis of the radially inner diameter. Further, the bristle bore central axis is offset from the outer central axis of the radially outer diameter. Moreover, the brush seal is disposed around a rotating component, such that the bristle bore central axis is aligned with a component axis defined by the rotating component and the bristle pack engages with the rotating component.

The present disclosure provides a simple and cost effective technique of eliminating any radial offset that may be present between a bore of a seal housing and a component outer diameter of the rotating component. The offset, that may be present due to manufacturing tolerances and assembly tolerances, including bearing tolerances, may be eliminated based on an alignment of the bristle bore central axis and the component axis. Further, as the bristle bore is concentric with the component outer diameter, a uniform circumferential clearance may be present between the bristles and the rotating component, which may provide optimum leakage through the brush seal. Moreover, the uniform circumferential clearance may eliminate regions of increased interference between the bristles and the rotating component, which may in turn reduce heat generation at an interface of the bristles and the rotating component. The reduced heat generation may increase an operating life of the bristles and may reduce or prevent instability/failure of the rotating component.

In some embodiments, the annular plate assembly includes at least one annular plate defining the radially inner diameter and the radially outer diameter. An eccentricity may be formed at the radially inner diameter or the radially outer diameter, so that the radially inner diameter and the radially outer diameter are eccentric with respect to each other. Due to the eccentricity formed at the radially inner diameter or the radially outer diameter, the bristle bore may be concentric with the component outer diameter of the rotating component and a uniform circumferential clearance may be present between the bristles and the rotating component.

In some embodiments, the at least one annular plate comprises a first annular plate and a second annular plate at least partially receiving the bristle pack therebetween. In an example, the first and second annular plates may together define the radially outer diameter and the eccentricity may be formed at the radially outer diameter, such that the bristle bore may be concentric with the component outer diameter of the rotating component and a uniform circumferential clearance may be present between the bristles and the rotating component. In another example, the second annular plate may define the radially inner diameter and the eccentricity may be formed at the radially inner diameter, such that the bristle bore may be concentric with the component outer diameter of the rotating component and a uniform circumferential clearance may be present between the bristles and the rotating component.

In some embodiments, the second annular plate defines a pocket configured to receive a high pressure fluid. The pocket may allow the high pressure fluid to offload a contact force from the bristles to the annular plate assembly.

In some embodiments, the first annular plate is coupled to or integral with the second annular plate. The first annular plate may be coupled to the second annular plate by welding.

Accordingly, the teachings of the present disclosure may be applied to welded brush seals. Alternatively, the first and second annular plates may form a single piece structure.

In some embodiments, the annular plate assembly includes a spiral-wound ring. Further, each of the plurality of bristles is coupled to the spiral-wound ring. Accordingly, the teachings of the present disclosure may be applied to wound brush seals having the spiral-wound ring.

In some embodiments, the annular plate assembly further includes a first annular plate and a second annular plate. The first annular plate defines the radially outer diameter and the second annular plate defines the radially inner diameter. The spiral-wound ring is disposed between the first annular plate and the second annular plate. In another example, the first and second annular plates may together define the radially outer diameter and the eccentricity may be formed at the radially outer diameter, such that the bristle bore may be concentric with the component outer diameter of the rotating component and a uniform circumferential clearance may be present between the bristles and the rotating component. In another example, the second annular plate may define the radially inner diameter and the eccentricity may be formed at the radially inner diameter, such that the bristle bore may be concentric with the component outer diameter of the rotating component and a uniform circumferential clearance may be present between the bristles and the rotating component.

In some embodiments, the annular plate assembly includes at least one annular plate and a spacer circumferentially surrounding the at least one annular plate. The spacer is fixedly coupled to the at least one annular plate. The spacer defines the radially outer diameter and the at least one annular plate defines the radially inner diameter. The spacer may be installed in brush seals with dimensional constraints. For example, in applications where it may not be possible to form the eccentricity at the radially outer diameter or the radially inner diameter of the at least one annular plate, the eccentricity may be formed on an inner diameter of the spacer or the radially outer diameter defined by the spacer.

In some embodiments, the annular plate assembly includes at least one annular plate and a cartridge. The cartridge includes a first portion extending axially along the bristle bore central axis and circumferentially surrounding the at least one annular plate and a second portion extending radially from the first portion. The first portion of the cartridge defines the radially outer diameter and the at least one annular plate or the second portion of the cartridge defines the radially inner diameter. The cartridge may be installed in brush seals with dimensional constraints. For example, in applications where it may not be possible to form the eccentricity at the radially outer diameter or the radially inner diameter of the at least one annular plate, the eccentricity may be formed on an inner diameter of the cartridge or the radially outer diameter defined by the first portion of the cartridge.

In some embodiments, the second portion defines a pocket configured to receive a high pressure fluid. The pocket may allow the high pressure fluid to offload a contact force from the bristles to the annular plate assembly.

In some embodiments, the offset between the inner central axis and the outer central axis is from 0.1 millimetres (mm) to 1 mm for every 1 metre (m) of the radially outer diameter. The offset may vary based on a value of the radially outer diameter.

In a second aspect, there is provided a gas turbine engine. The gas turbine engine includes a seal housing defining a seal housing bore. The gas turbine engine further includes a rotating component at least partially received within the seal housing bore and defining a component outer diameter radially spaced apart from the seal housing. The gas turbine engine further includes the brush seal of the first aspect. The brush seal is received within the seal housing bore and radially disposed between the component outer diameter of the rotating component and the seal housing. Due to the elimination of the offset between the seal housing bore and the component outer diameter of the rotating component, there is a circumferentially uniform clearance around the rotating component, leading to reduced leakage of fluid. The circumferentially uniform clearance may further provide the optimum leakage. Moreover, as there is no concentrated region of increased heat generation due to high interference of the bristles with the rotating component, a possibility of thermal instability and/or failure of the rotating component may be reduced or prevented.

In a third aspect, there is provided a method of installing the brush seal of the first aspect in the gas turbine engine of the second aspect. The method includes determining an eccentricity between the seal housing bore and the component outer diameter of the gas turbine engine of the second aspect. The method further includes manufacturing the brush seal of the first aspect based on the eccentricity. The method further includes installing the brush seal between the rotating component and the seal housing of the gas turbine engine. The method of installing the brush seal as described herein is simple and time-efficient. In some examples, a number of brush seals having different values of the eccentricity may be manufactured such that the brush seal having the eccentricity that closely matches with the eccentricity between the seal housing bore and the component outer diameter may be chosen and installed in the gas turbine engine.

In some embodiments, the step of determining the eccentricity further includes coupling a ring to the seal housing. The ring includes an annular pocket. The step of determining the eccentricity further includes providing a surface replicating compound within the annular pocket. The step of determining the eccentricity further includes impinging the rotating component on the surface replicating compound, such that an indentation profile is formed on the surface replicating component. The step of determining the eccentricity further includes measuring a radial distance between an outer diameter of the ring and a radially outboard edge of the indentation profile at a plurality of circumferential positions. The step of determining the eccentricity further includes determining the eccentricity between the seal housing bore and the component outer diameter based on the radial distance measured at the plurality of circumferential positions. The technique for determining the eccentricity as described herein may include a simple and low cost set-up that may be used for measuring the eccentricity between various components where the brush seals need to be installed.

In some embodiments, the step of determining the eccentricity further includes coupling a dial gauge to the rotating component. The step of determining the eccentricity further includes engaging a tip of the dial gauge with the seal housing. The step of determining the eccentricity further includes measuring a radial distance between the component outer diameter and the seal housing at a plurality of circumferential positions. The step of determining the eccentricity further includes determining the eccentricity between the seal housing bore and the component outer diameter based on the radial distance measured at the plurality of circumferential positions. The technique for determining the eccentricity as described herein may include a simple and low cost set-up that may be used for measuring the eccentricity between various components where the brush seals need to be installed.

In a fourth aspect, there is provided a method of manufacturing the brush seal of the first aspect. The method includes providing the annular plate assembly. The method further includes coupling the bristle pack to the annular plate assembly. An eccentricity is formed at the radially inner diameter or the radially outer diameter, such that the radially inner diameter and the radially outer diameter are eccentric with respect to each other. In an example, the eccentricity may be formed by a machining process after the bristle pack is coupled to the annular plate assembly. In other examples, the first and/or second annular plates may be manufactured such that the first and/or second annular plates may inherently include the eccentricity.

The present disclosure may generally relate to brush seals associated with gas turbine engines. The brush seal can also be associated with a steam engine or a jet engine.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described by way of example only, with reference to the Figures, in which:

FIG. 6A illustrates a schematic sectional side view of a portion of the brush seal of FIG. 5;

FIG. 6B illustrates a schematic sectional side view of a portion of a brush seal having a pocket;

FIG. 8A illustrates a schematic front view of the brush seal of FIG. 7;

FIG. 8B illustrates a schematic front view of a spacer that may be associated with the brush seal of FIG. 7;

DETAILED DESCRIPTION

Aspects and embodiments of the present disclosure will now be discussed with reference to the accompanying Figures. Further aspects and embodiments will be apparent to those skilled in the art.

Figure 1:
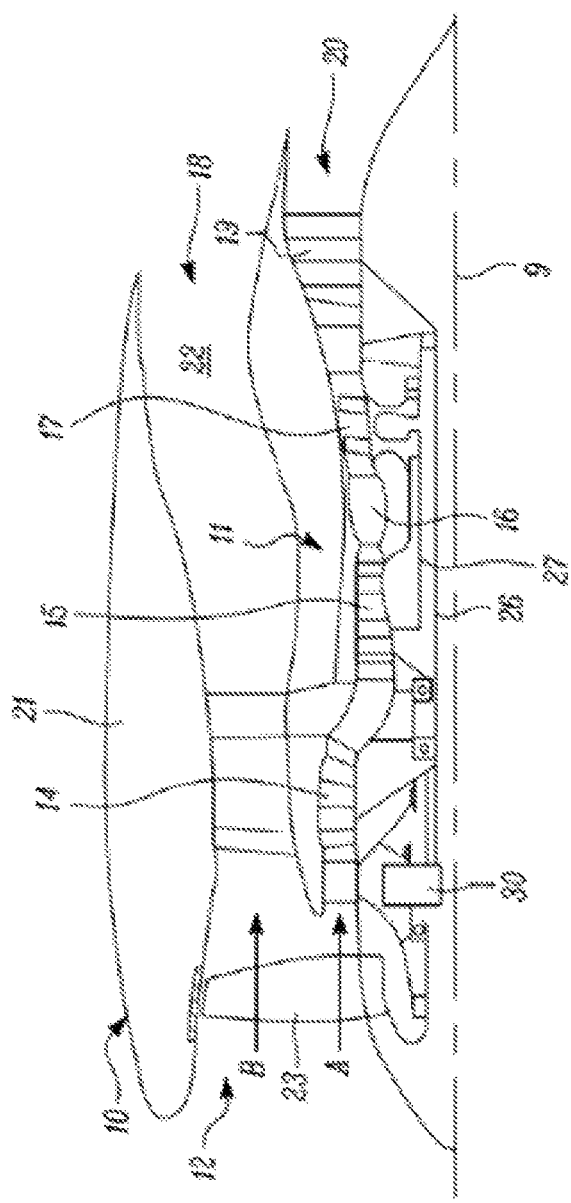
FIG. 1 is a schematic sectional side view of a gas turbine engine.

FIG. 1 illustrates a gas turbine engine 10 having a rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, a combustion equipment 16, a high pressure turbine 17, a low pressure turbine 19, and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
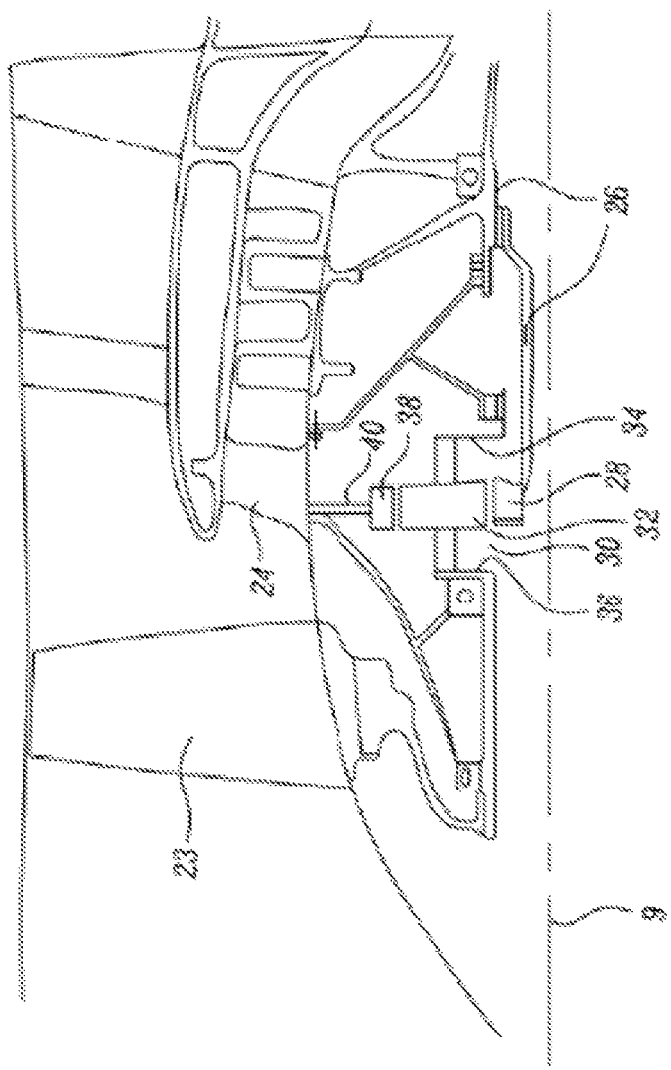
FIG. 2 is a close-up schematic sectional side view of an upstream portion of the gas turbine engine of FIG. 1.

An exemplary arrangement for a geared fan gas turbine engine 10 is shown in FIG. 2. The low pressure turbine 19 (see FIG. 1) drives the shaft 26, which is coupled to a sun wheel, or sun gear 28 of the epicyclic gearbox 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the rotational axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the shaft 26 with the lowest rotational speed in the engine 10 (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
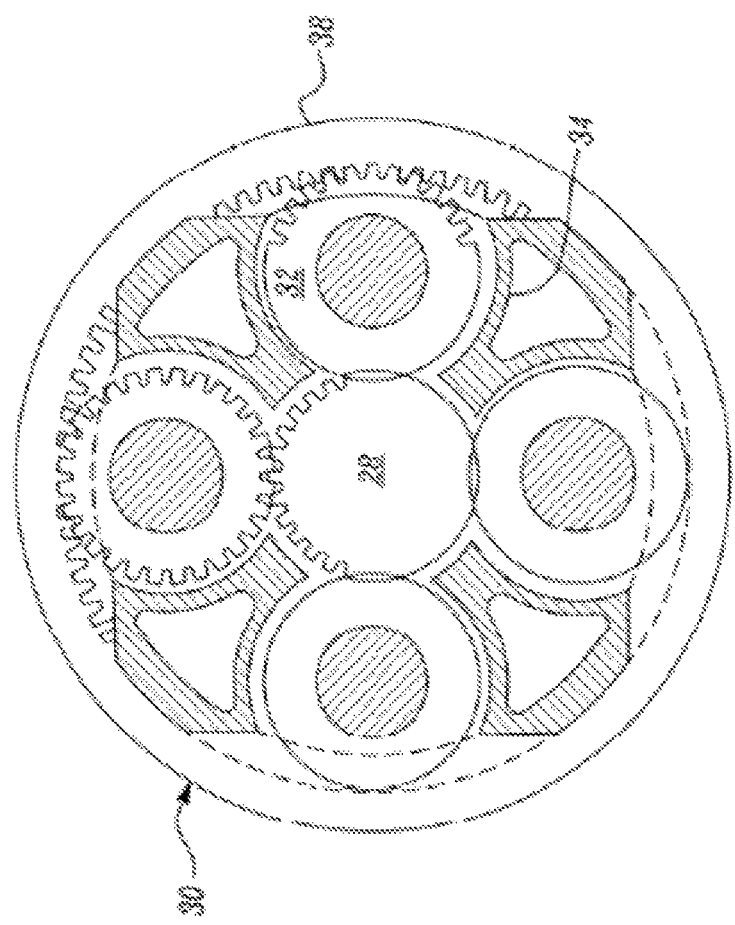
FIG. 3 is a partially cut-away view of a gearbox for the gas turbine engine of FIG. 1.

The epicyclic gearbox 30 is shown by way of example in greater detail in FIG. 3. Each of the sun gear 28, the planet gears 32, and the ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement, the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as, the linkages 36, 40 in the FIG. 2 example) between the gearbox 30 and other parts of the engine 10 (such as the input shaft 26, the output shaft, and the fixed structure 24) may have any desired degree of stiffness or flexibility. By way of further example, any suitable arrangement of the bearings between rotating and stationary parts of the engine 10 (for example, between the input and output shafts from the gearbox and the fixed structures, such as, the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangements, and bearing locations.

Optionally, the gearbox may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine 10 shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as, an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial, and circumferential directions are mutually perpendicular.

In addition, the present invention is equally applicable to aero gas turbine engines, marine gas turbine engines, and land-based gas turbine engines.

Figure 4:
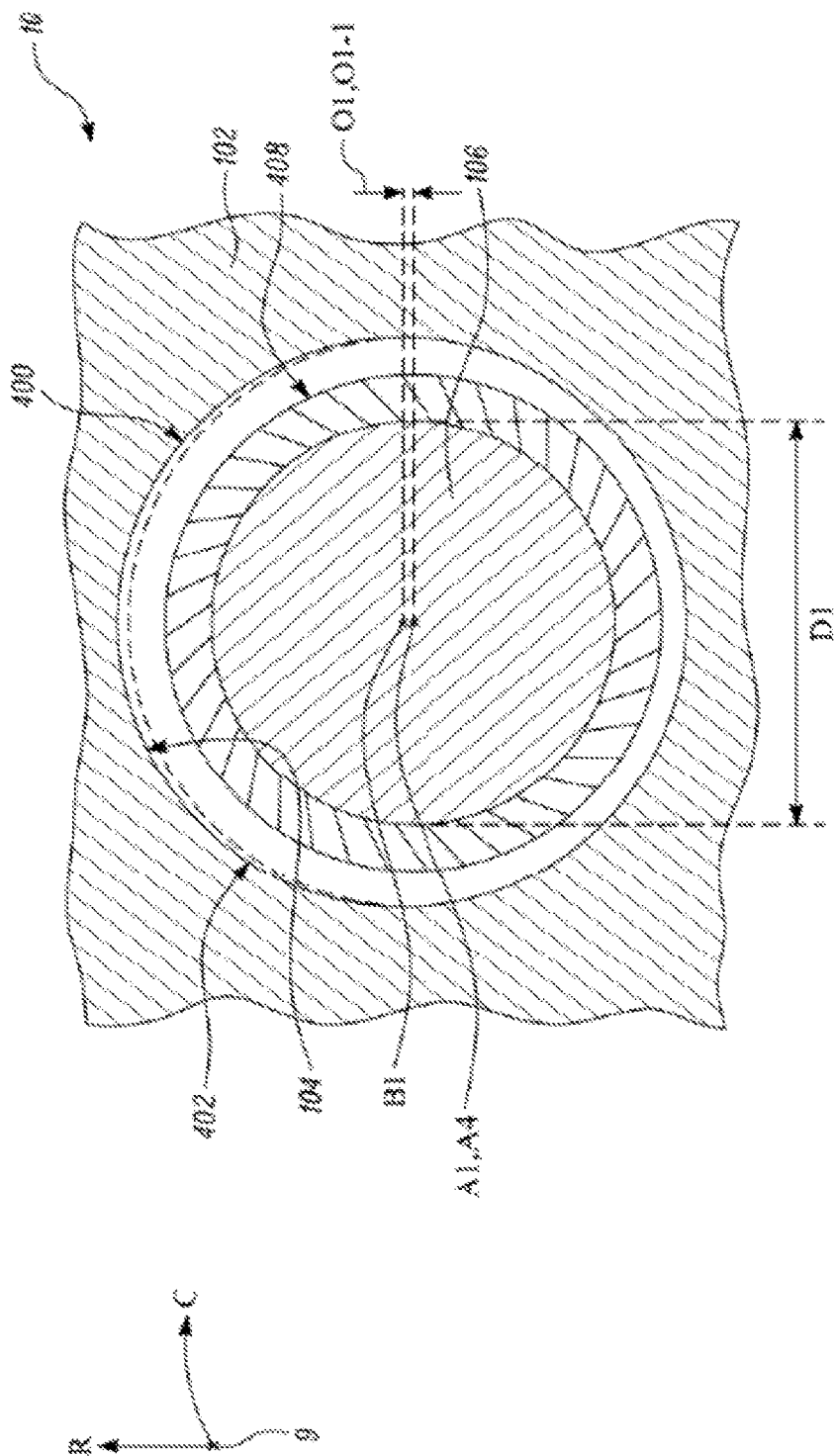
FIG. 4 is a schematic front view of a brush seal installed between a seal housing and a rotating component associated with the gas turbine engine of FIG. 1 according to an embodiment of the present disclosure.

Referring to FIG. 4, a schematic front view of a portion of the gas turbine engine 10 is illustrated. It should be noted that a radial direction R is defined with respect to the rotational axis 9 of the gas turbine engine 10. As used herein, terms that refer to a radial direction, such as "radially outer", "radially inner", "radially extending", "radially inwards", "radially outwards", and "radially proximal", are with respect to the radial direction R. It should be noted that a circumferential direction C is defined with respect to the rotational axis 9 of the gas turbine engine 10. As used herein, terms that refer to a circumferential direction, such as "circumferentially surrounding", "circumferential position", "circumferential orientation", are with respect to the circumferential direction C. Further, terms that refer to an axial direction, such as "axially spaced apart", "axially along", "axially align", are defined along the rotational axis 9.

The gas turbine engine 10 includes a seal housing 102 defining a seal housing bore 104. The seal housing bore 104 defines a bore axis B1. The gas turbine engine 10 further includes a rotating component 106 at least partially received within the seal housing bore 104 and defining a component outer diameter D1 radially spaced apart from the seal housing 102. The rotating component 106 may include, for example, a rotor. The rotating component 106 also defines a component axis A1. The component axis A1 is a central axis of the component outer diameter D1. In some examples, the rotating component 106 may be installed in the gas turbine engine 10 such that the seal housing bore 104 may be eccentric relative to the component outer diameter D1. For example, an eccentricity may be present between the seal housing bore 104 and the component outer diameter D1. The eccentricity can be defined based on an offset O1-1 that may be present between the bore axis B1 and the component axis A1.

Further, the gas turbine engine 10 includes a brush seal 400. The brush seal 400 is received within the seal housing bore 104 and radially disposed between the component outer diameter D1 of the rotating component 106 and the seal housing 102. In an example, the brush seal 400 may be installed at seal locations that include multiple components. For example, the brush seal 400 may embody a high pressure turbine pre-swirl seal, or the brush seal 400 may be disposed at a seal location between different engine modules, such as, between a support structure of the high pressure turbine 17 (see FIG. 1) and a rotor of the low pressure turbine 19 (see FIG. 1)/an intermediate pressure turbine.

Figure 5:
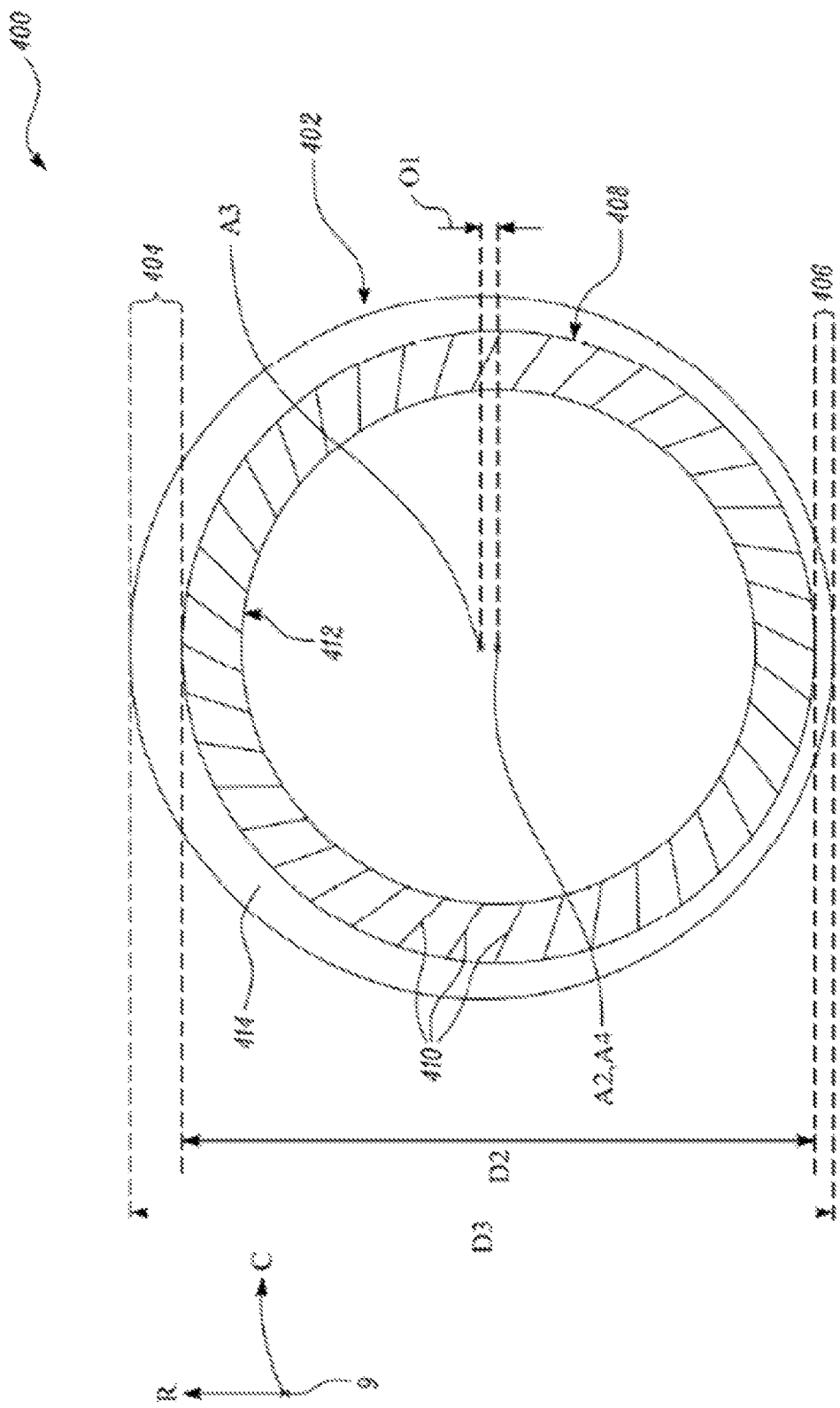
FIG. 5 is a schematic front view of the brush seal of FIG. 4.

As shown in FIG. 5, the brush seal 400 includes an annular plate assembly 402. The annular plate assembly 402 defines a radially inner diameter D2 having an inner central axis A2 and a radially outer diameter D3 having an outer central axis A3. The inner central axis A2 and the outer central axis A3 are spaced apart from each other by an offset O1, such that the radially inner diameter D2 and the radially outer diameter D3 are eccentric with respect to each other. In some embodiments, the offset O1 between the inner central axis A2 and the outer central axis A3 is from 0.1 millimetres (mm) to 1 mm for every 1 metre (m) of the radially outer diameter D3. Further, the offset O1 may correspond to the offset O1-1 (see FIG. 4) between the bore axis B1 (see FIG. 4) and the component axis A1 (see FIG. 4). The offset O1 may be defined based on a formation of an eccentricity E1 (shown in FIG. 6A) at the radially outer diameter D3 or the radially inner diameter D2. The eccentricity E1 formed at the radially outer diameter D3 of the annular plate assembly 402 or the radially inner diameter D2 may cause the radially inner diameter D2 to be eccentric relative to the radially outer diameter D3. A value of the eccentricity E1 may correspond to the offset O1 and the offset O1-1.

In the illustrated embodiment of FIG. 5, the eccentricity E1 is formed at the radially outer diameter D3 of the annular plate assembly 402. As the radially inner diameter D2 and the radially outer diameter D3 are eccentric, a region 404 of maximum distance may be defined between the radially inner diameter D2 and the radially outer diameter D3. Moreover, a region 406 of minimum distance may be defined between the radially inner diameter D2 and the radially outer diameter D3. It should be noted that the regions 404, 406 of the maximum and minimum distances, respectively, may be disposed at any location of the annular plate assembly 402 depending on the eccentricity between the seal housing bore 104 (see FIG. 4) and the component outer diameter D1.

The brush seal 400 also includes a bristle pack 408 coupled to the annular plate assembly 402. The bristle pack 408 includes a plurality of bristles 410. The plurality of bristles 410 defines a bristle bore 412 having a bristle bore central axis A4. As illustrated in FIG. 5, the bristle bore central axis A4 is aligned with the inner central axis A2 of the radially inner diameter D2. Specifically, the bristle bore central axis A4 is coincident with the inner central axis A2. Further, the bristle bore central axis A4 is offset from the outer central axis A3 of the radially outer diameter D3. Specifically, the bristle bore central axis A4 and the outer central axis A3 are spaced apart from each other by the offset O1.

The brush seal 400 is disposed around the rotating component 106 (see FIG. 4), such that the bristle bore central axis A4 is aligned with the component axis A1 defined by the rotating component 106 and the bristle pack 408 engages with the rotating component 106. Due to the offset O1 between the bristle bore central axis A4 and the outer central axis A3, a uniform circumferential clearance may be present between the bristles 410 and the rotating component 106. Therefore, a possibility of leakage through the bristle pack 408 due to excessive circumferential clearance around one or more portions of the bristle pack 408 may be reduced, which may in turn provide optimum leakage. Moreover, a possibility of excessive heat generation due to increased interference between the bristles 410 and the rotating component 106 may be reduced, which may in turn reduce or prevent a possibility of instability and/or failure of the rotating component 106. In some examples, the circumferential clearance between the bristles 410 and the rotating component 106 may be from about 0 mm to about 1 mm, without any limitations. In some examples, the circumferential clearance may vary based on a value of the radially outer diameter D3.

FIG. 6A illustrates a schematic sectional side view of a portion of the brush seal 400 of FIG. 5. In some embodiments, the annular plate assembly 402 includes at least one annular plate 414, 416 defining the radially inner diameter D2 and the radially outer diameter D3. In the accompanying FIG. 6A, the radially outer diameter D3 and the radially inner diameter D2 are annotated as a radius D3/2 and a radius D2/2, respectively, as only a portion of the brush seal 400 is illustrated in FIG. 6A. The radially outer diameter D3 and the radially inner diameter D2 will be equal to twice the value of the radius D3/2 and the radius D2/2, respectively.

As shown in FIG. 6A, in some embodiments, the at least one annular plate 414, 416 includes a first annular plate 414 and a second annular plate 416 at least partially receiving the bristle pack 408 therebetween. The at least one annular plate 414 may be interchangeably referred to as the first annular plate 414 and the at least one annular plate 416 may be interchangeably referred to as the second annular plate 416. The first annular plate 414 may be axially spaced apart from the second annular plate 416 such that the bristle pack 408 may be received in a gap between the first and second annular plates 414, 416. Further, the first annular plate 414 defines a first height H1 that may be lesser than a second height H2 defined by the second annular plate 416. Moreover, in the illustrated embodiment of FIG. 6A, a first width W1 defined by the first annular plate 414 may be substantially equal to a second width W2 defined by the second annular plate 416. Alternatively, the first width W1 may be different from the second width W2.

In the illustrated embodiment of FIG. 6A, the radially outer diameter D3 is defined by the first and second annular plates 414, 416. Specifically, the eccentricity E1 may be formed at each of the first and second annular plates 414, 416. When the eccentricity E1 is formed at the radially outer diameter D3 defined by the first and second annular plates 414, 416, an initial outer diameter (not shown) of the first and second annular plates 414, 416 may be greater than the radially outer diameter D3 by at least the value of the eccentricity E1 so that the radially outer diameter D3 with the desired eccentricity E1 may be defined on the brush seal 400.

Further, the radially inner diameter D2 is defined by the second annular plate 416. In an embodiment, wherein the first height H1 may be substantially equal to the second height H2, the radially inner diameter D2 may be defined by the first and second annular plates 414, 416. Moreover, in some embodiments, the eccentricity E1 may be formed at the radially inner diameter D2 instead of being defined at the radially outer diameter D3, without any limitations. Further, when the eccentricity E1 may be formed at the radially inner diameter D2 defined by the second annular plate 416, an initial inner diameter (not shown) of the second annular plate 416 may be lesser than the radially inner diameter D2 by at least the value of the eccentricity E1 so that the radially outer diameter D3 with the eccentricity E1 may be formed on the brush seal 400.

The bristle pack 408 defines a third height H3, such that the third height H3 may be greater than each of the first and second heights H1, H2. In some embodiments, the first annular plate 414 is coupled to or integral with the second annular plate 416. In the illustrated embodiment of FIG. 6A, the first annular plate 414 is coupled to the second annular plate 416. In some examples, the first annular plate 414, the bristle pack 408, and the second annular plate 416 may be connected to each other by welding. Specifically, a weld joint 418 may couple the first annular plate 414, the bristle pack 408, and the second annular plate 416. It should be noted that the value of the eccentricity E1 may be less than a height H4 of the weld joint 418. Alternatively, any other joining process, such as, soldering, brazing, and the like may be used for connecting the first annular plate 414, the bristle pack 408, and the second annular plate 416. Alternatively, the first annular plate 414 and the second annular plate 416 may include a single piece design. For example, the first and second annular plates 414, 416 may together define a C-shaped cross-section having a groove for receiving a portion of the bristle pack 408, without any limitations.

It should be noted that the first and second annular plates 414, 416 may be manufactured by any manufacturing process, such as, casting or an additive manufacturing process. It should be further noted that the eccentricity E1 may be formed at the radially inner diameter D2 or the radially outer diameter D3 by a machining process, without any limitations. In an example, the eccentricity E1 may be formed after an assembly of the brush seal 400. For forming the eccentricity E1 at the radially outer diameter D3, the first and second annular plates 414, 416 may be machined in a tooling set-up such that the radially outer diameter D3 may be eccentric with respect to the radially inner diameter D2. Further, the bristle bore 412 may be machined in a tooling set-up such that the bristle bore 412 may be concentric with respect to the radially inner diameter D2. Moreover, the value of the eccentricity E1 may be engraved on the brush seal 400 or the value of the eccentricity E1 may be stored in manufacturing or inspection records. In some examples, multiple brush seals with different values of eccentricities E1 may be manufactured for a specific application. Further, the brush seal 400 having the eccentricity E1 that closely matches with the eccentricity determined between the seal housing bore 104 (see FIG. 4) and the component outer diameter D1 (see FIG. 4) may be installed in the gas turbine engine 10 (see FIG. 1).

FIG. 6B illustrates a partial sectional side view of a brush seal 600, according to another embodiment of the present disclosure. The brush seal 600 includes an annular plate assembly 602. The annular plate assembly 602 includes a bristle pack 608 similar to the bristle pack 408 explained in relation to FIGS. 5 and 6A. Further, the bristle pack 608 includes a plurality of bristles 610 similar to the bristles 410 explained in relation to FIGS. 5 and 6A. The plurality of bristles 610 define a bristle bore 612 having a bristle bore central axis A4-1.

The annular plate assembly 602 may include a first annular plate 614 and a second annular plate 616. The first annular plate 614 may be interchangeably referred to as at least one annular plate 614 and the second annular plate 616 may be interchangeably referred to as at least one annular plate 616. The first and second annular plates 614, 616 are substantially similar to the first and second annular plates 414, 416, respectively, described in relation to FIG. 6A. However, in some embodiments, the second annular plate 616 defines a pocket 620 configured to receive a high pressure fluid. The pocket 620 may be embodied as a pressure-balance pocket. During an operation of the gas turbine engine 10, the pocket 620 may be filled with the high pressure fluid via the bristle pack 608. The pocket 620 may allow the high pressure fluid to offload a contact force from the bristles 610 to the annular plate assembly 602. In the illustrated embodiment of FIG. 6B, the first annular plate 614 is coupled to the second annular plate 616 by a weld joint 618. Alternatively, the first annular plate 614 may be integral with the second annular plate 616.

Further, a radially outer diameter D3-1 may be defined by the first and second annular plates 614, 616. Moreover, a radially inner diameter D2-1 may be defined by the second annular plate 616. Alternatively, the radially inner diameter D2-1 may be defined by the first and second annular plates 614, 616. In the accompanying FIG. 6B, the radially outer diameter D3-1 and the radially inner diameter D2-1 are annotated as a radius D3-1/2 and a radius D2-1/2, respectively, as only a portion of the brush seal 600 is illustrated in FIG. 6B. The radially outer diameter D3-1 and the radially inner diameter D2-1 will be equal to twice the value of the radius D3-1/2 and the radius D2-1/2, respectively.

As illustrated in FIG. 6B, an inner central axis A2-1 defined by the radially inner diameter D2-1 and an outer central axis A3-1 defined by the radially outer diameter D3-1 are spaced apart from each other by an offset O2, such that the radially inner diameter D2-1 and the radially outer diameter D3-1 are eccentric with respect to each other. As an eccentricity E2 is formed at the radially outer diameter D3-1, the eccentricity E2 may be formed at each of the first and second annular plates 614, 616. When the eccentricity E2 is formed at the radially outer diameter D3-1 defined by the first and second annular plates 614, 616, an initial outer diameter of each of the first and second annular plates 614, 616 may be greater than the radially outer diameter D3-1 by at least the value of the eccentricity E2 so that the radially outer diameter D3-1 with the desired eccentricity E2 may be formed on the brush seal 600. In other examples, the eccentricity E2 may be formed at the radially inner diameter D2-1 instead of being defined at the radially outer diameter D3-1, without any limitations.

Figure 7:
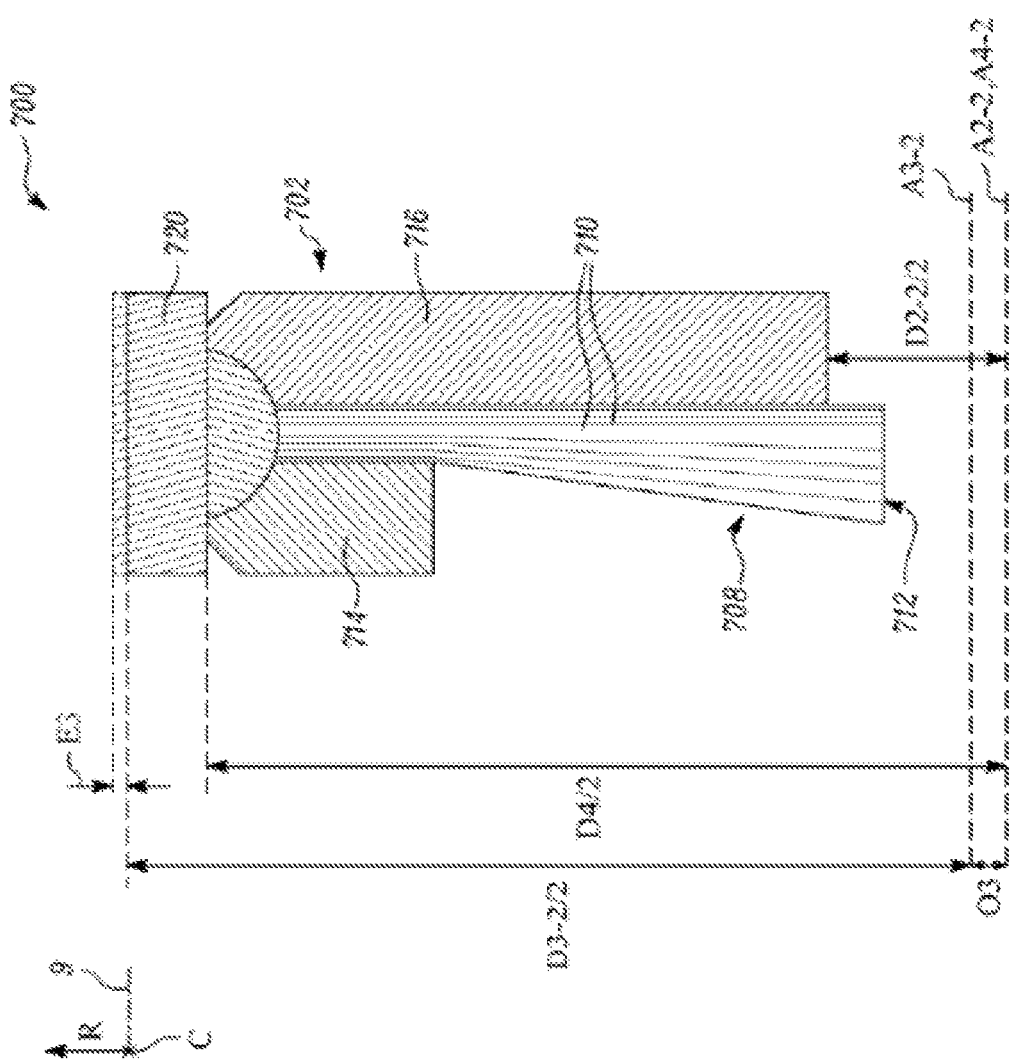
FIG. 7 illustrates a schematic sectional side view of a portion of a brush seal having a spacer.

FIG. 7 illustrates a partial sectional side view of a brush seal 700, according to yet another embodiment of the present disclosure. The brush seal 700 includes an annular plate assembly 702 that may be similar to the annular plate assembly 402 explained in relation to FIGS. 5 and 6A. The annular plate assembly 702 includes a bristle pack 708 similar to the bristle pack 408 explained in relation to FIGS. 5 and 6A. Further, the bristle pack 708 includes a plurality of bristles 710 similar to the bristles 410 explained in relation to FIGS. 5 and 6A. The plurality of bristles 710 define a bristle bore 712 having a bristle bore central axis A4-2.

In some embodiments, the annular plate assembly 702 includes at least one annular plate 714, 716 and a spacer 720 circumferentially surrounding the at least one annular plate 714, 716. The spacer 720 may be fixedly coupled to the at least one annular plate 714, 716. The at least one annular plate 714, 716 may include a first annular plate 714 and a second annular plate 716. The at least one annular plate 714 may be interchangeably referred to as the first annular plate 714 and the at least one annular plate 716 may be interchangeably referred to as the second annular plate 716. The first annular plate 714 and the second annular plate 716 are similar to the first annular plate 414 and the second annular plate 416, respectively, as explained in reference to FIGS. 5 and 6A.

The spacer 720 may be embodied as a ring shaped structure that surrounds each of the first and second annular plates 714, 716. The spacer 720 defines a radially outer diameter D3-2 and the at least one annular plate 716 defines a radially inner diameter D2-2. Specifically, the radially inner diameter D2-2 may be defined by the second annular plate 716. In the accompanying FIG. 7, the radially outer diameter D3-2 and the radially inner diameter D2-2 are annotated as a radius D3-2/2 and a radius D2-2/2, respectively, as only a portion of the brush seal 700 is illustrated in FIG. 7. The radially outer diameter D3-2 and the radially inner diameter D2-2 will be equal to twice the value of the radius D3-2/2 and the radius D2-2/2, respectively.

In an example, the spacer 720 may be fixedly coupled to each of the first and second annular plates 714, 716 by welding or using mechanical fasteners, such as, bolts, pins, screws, and the like. Alternatively, any other joining process may be used to couple the spacer 720 with the first and second annular plates 714, 716.

As illustrated in FIG. 7, an inner central axis A2-2 defined by the radially inner diameter D2-2 and an outer central axis A3-2 defined by the radially outer diameter D3-2 are spaced apart from each other by an offset O3, such that the radially inner diameter D2-2 and the radially outer diameter D3-2 are eccentric with respect to each other. In some embodiments, the offset O3 between the inner central axis A2-2 and the outer central axis A3-2 is from 0.1 mm to 1 mm for every 1 m of the radially outer diameter D3-2.

FIG. 8A illustrates a front view of the spacer 720 shown in FIG. 7. In an example, the offset O3 (see FIG. 7) may be defined based on a formation of an eccentricity E3 at the radially outer diameter D3-2 defined by the spacer 720. Due to the eccentricity E3, an inner diameter D4 defined by the spacer 720 may be eccentric relative to the radially outer diameter D3-2. It should be noted that the eccentricity E3 at the radially outer diameter D3-2 of the spacer 720 may be formed by a machining process, without any limitations. For example, the eccentricity E3 may be formed after an assembly of the brush seal 700 (see FIG. 7). It should be further noted that the spacer 720 may be manufactured by any manufacturing process, such as, casting or an additive manufacturing process.

When the eccentricity E3 is formed at the radially outer diameter D3-2 defined by the spacer 720, a maximum outer diameter SD1 of the spacer 720 may be greater than the radially outer diameter D3-2 by at least the value of the eccentricity E3 so that the radially outer diameter D3-2 having the eccentricity E3 may be formed on the brush seal 700. Further, a minimum outer diameter SD2 of the spacer 720 may be lesser than the radially outer diameter D3-2 by at least the value of the eccentricity E3 so that the radially outer diameter D3-2 having the eccentricity E3 may be formed on the brush seal 700. In some examples, a number of spacers similar to the spacer 720 with different values of eccentricities E3 may be manufactured, such that based on the eccentricity determined between the seal housing bore 104 (see FIG. 4) and the component outer diameter D1 (see FIG. 4), an appropriate spacer from the different spacers may be chosen.

It should be noted that the spacer 720 may be installed in brush seals with dimensional constraints. For example, in applications where it may not be possible to form the eccentricity E3 at an inner diameter or an outer diameter of the at least one annular plate 714, 716 (see FIG. 7), the eccentricity E3 may be formed at the radially outer diameter D3-2 defined by the spacer 720.

Referring now to FIG. 8B, a front view of the spacer 720 of FIG. 7 is illustrated. The spacer 720 defines the radially outer diameter D3-2 and the inner diameter D4. In the illustrated embodiment of FIG. 8B, an eccentricity E4 is formed at the inner diameter D4 of the spacer 720. Due to the eccentricity E4, the radially inner diameter D2-2 (see FIG. 7) defined by the second annular plate 716 (see FIG. 7) may be eccentric relative to the inner diameter D4 defined by the spacer 720. Moreover, due to the eccentricity E4, the inner diameter D4 of the spacer 720 may be eccentric relative to the radially outer diameter D3-2 defined by the spacer 720. It should be noted that the eccentricity E4 at the inner diameter D4 of the spacer 720 may be formed by a machining process, without any limitations. In such an example, the eccentricity E4 may be formed before an assembly of the brush seal 700 (see FIG. 7). It should be further noted that the spacer 720 may be manufactured by any manufacturing process, such as, casting or an additive manufacturing process.

Further, when the eccentricity E4 is formed at the inner diameter D4 defined by the spacer 720, a maximum inner diameter SD3 of the spacer 720 may be greater than the inner diameter D4 by at least the value of the eccentricity E4 so that the inner diameter D4 having the eccentricity E4 may be formed on the brush seal 700. Furthermore, a minimum inner diameter SD4 of the spacer 720 may be lesser than the inner diameter D4 by at least the value of the eccentricity E4 so that the inner diameter D4 having the eccentricity E4 may be formed on the brush seal 700. In some examples, a number of spacers with different values of eccentricities E4 may be manufactured, such that based on the eccentricity determined between the seal housing bore 104 (see FIG. 4) and the component outer diameter D1 (see FIG. 4), an appropriate spacer from the different spacers may be chosen.

Figures 9A, 9B:
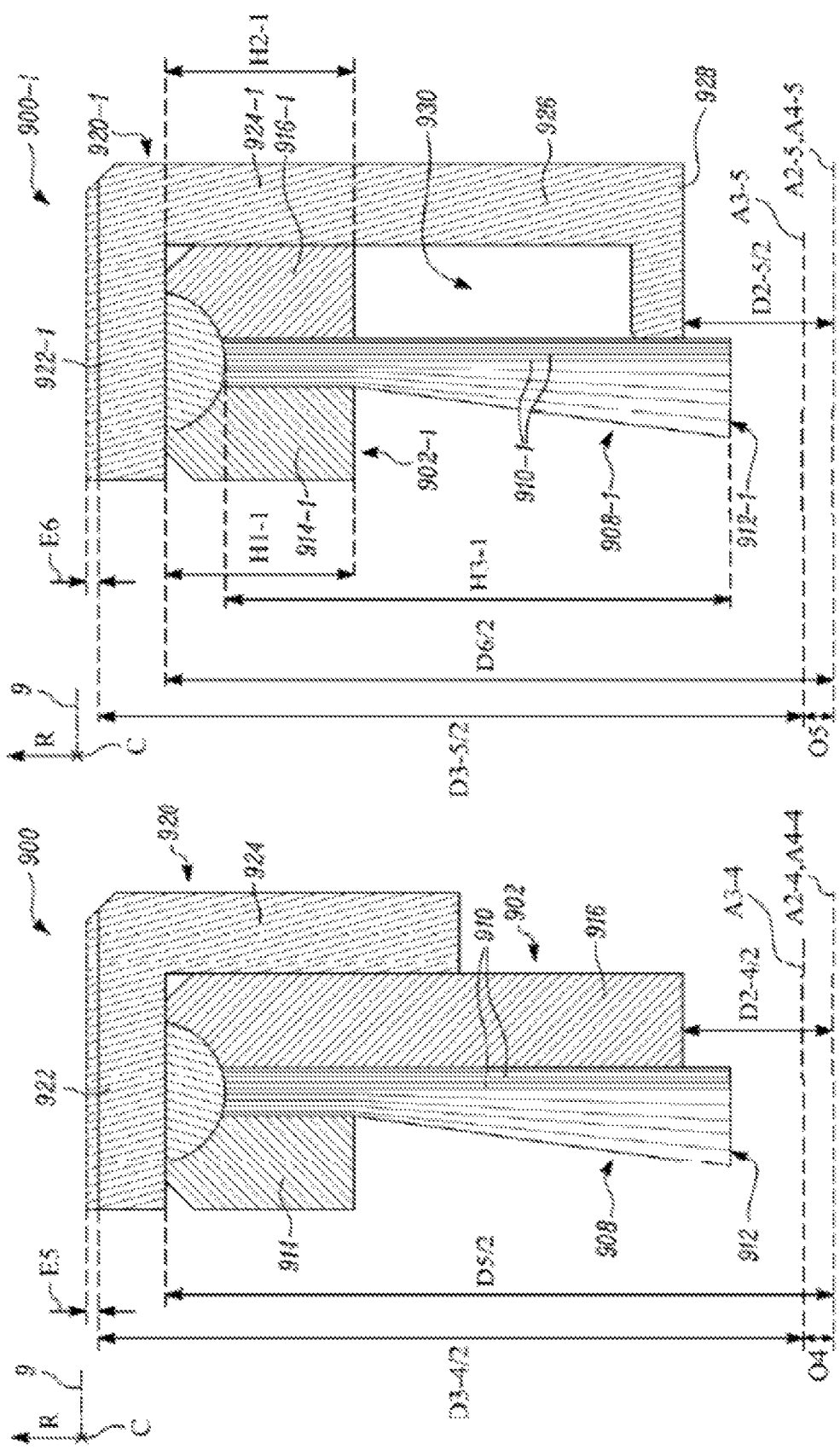
FIG. 9A illustrates a schematic sectional side view of a portion of a brush seal having a cartridge.
FIG. 9B illustrates a schematic sectional side view of a portion of a brush seal having a cartridge and a pocket defined by the cartridge.

FIG. 9A illustrates a partial sectional side view of a brush seal 900, according to yet another embodiment of the present disclosure. The brush seal 900 includes an annular plate assembly 902 that may be similar to the annular plate assembly 402 explained in relation to FIGS. 5 and 6A. The annular plate assembly 902 includes a bristle pack 908 similar to the bristle pack 408 explained in relation to FIGS. 5 and 6A. Further, the bristle pack 908 includes a plurality of bristles 910 similar to the bristles 410 explained in relation to FIGS. 5 and 6A. The plurality of bristles 910 define a bristle bore 912 having a bristle bore central axis A4-4.

In some embodiments, the annular plate assembly 902 includes at least one annular plate 914, 916 and a cartridge 920. The at least one annular plate 914, 916 may include a first annular plate 914 and a second annular plate 916 that are similar to the first annular plate 414 and the second annular plate 416, respectively, explained in reference to FIG. 6A. The at least one annular plate 914 may be interchangeably referred to as the first annular plate 914 and the at least one annular plate 916 may be interchangeably referred to as the second annular plate 916. Further, the cartridge 920 includes a first portion 922 extending axially along the bristle bore central axis A4-4 and circumferentially surrounding the at least one annular plate 914, 916. The cartridge 920 also includes a second portion 924 extending radially from the first portion 922. The first and second portions 922, 924 are substantially perpendicular to each other. The first and second portions 922, 924 together form an L-shaped cross-section. The first portion 922 circumferentially surrounds the first and second annular plates 914, 916, such that the first and second annular plates 914, 916 are radially disposed within the first portion 922. Further, the second portion 924 extends radially inwards from the first portion 922.

Further, the first portion 922 may be fixedly coupled to the first annular plate 914 and the second annular plate 916. Moreover, the second portion 924 may be fixedly coupled to the second annular plate 916. In an example, the cartridge 920 may be fixedly coupled to the first and second annular plates 914, 916 by welding or using mechanical fasteners, such as, bolts, pins, screws, and the like. Alternatively, any other joining process may be used to couple the cartridge 920 with the first and second annular plates 914, 916. The cartridge 920 may include a single piece design or various portions of the cartridge 920 may be fixedly coupled to each other by a suitable joining process. It should be further noted that the cartridge 920 may be manufactured by any manufacturing process, such as, casting or an additive manufacturing process.

Further, the first portion 922 of the cartridge 920 defines a radially outer diameter D3-4 and the at least one annular plate 914, 916 or the second portion 924 of the cartridge 920 defines the radially inner diameter D2-4. In the illustrated embodiment of FIG. 9A, the radially inner diameter D2-4 is defined by the second annular plate 916. In the accompanying FIG. 9A, the radially outer diameter D3-4 and the radially inner diameter D2-4 are annotated as a radius D3-4/2 and a radius D2-4/2, respectively, as only a portion of the brush seal 900 is illustrated in FIG. 9A. The radially outer diameter D3-4 and the radially inner diameter D2-4 will be equal to twice the value of the radius D3-4/2 and the radius D2-4/2, respectively.

As illustrated in FIG. 9A, an inner central axis A2-4 defined by the radially inner diameter D2-4 and an outer central axis A3-4 defined by the radially outer diameter D3-4 are spaced apart from each other by an offset O4, such that the radially inner diameter D2-4 and the radially outer diameter D3-4 are eccentric with respect to each other. In some embodiments, the offset O4 between the inner central axis A2-4 and the outer central axis A3-4 is from 0.1 mm to 1 mm for every 1 m of the radially outer diameter D3-4.

In some embodiments, the offset O4 may be defined based on a formation of an eccentricity E5 at an inner diameter D5 of the first portion 922 or the radially outer diameter D3-4 defined by the first portion 922. In the illustrated embodiment of FIG. 9A, the eccentricity E5 is formed at the radially outer diameter D3-4 defined by the first portion 922. It should be noted that the eccentricity E5 at the radially outer diameter D3-4 of the cartridge 920 may be formed by a machining process, without any limitations. For example, the eccentricity E5 may be formed after an assembly of the brush seal 900. Due to the eccentricity E5, the radially inner diameter D2-4 defined by the second annular plate 916 may be eccentric relative to the radially outer diameter D3-4 defined by the first portion 922. Due to the eccentricity E5, the inner diameter D5 of the first portion 922 may be eccentric relative to the radially outer diameter D3-4 defined by the first portion 922.

Further, when the eccentricity E5 is formed at the radially outer diameter D3-4 defined by the first portion 922, an initial outer diameter of the first portion 922 may be greater than the radially outer diameter D3-4 by at least the value of the eccentricity E5 so that the radially outer diameter D3-4 having the desired eccentricity E5 may be formed on the brush seal 900. In some examples, a number of cartridges with different values of eccentricities E5 may be manufactured, such that based on the eccentricity determined between the seal housing bore 104 (see FIG. 4) and the component outer diameter D1 (see FIG. 4), an appropriate cartridge from the different cartridges may be chosen. Alternatively, the offset O4 may be defined based on a formation of the eccentricity E5 at the inner diameter D5 of the first portion 922.

In some examples, the cartridge 920 may be coupled with the seal housing bore 104 instead of being coupled to the annular plate assembly 902. For example, the cartridge 920 may be coupled with the seal housing 102 (see FIG. 4) by a bolted connection. In such an example, the eccentricity E5 may be formed at the inner diameter D5 of the first portion 922.

It should be noted that the cartridge 920 may be installed in brush seals with dimensional constraints. For example, in applications where it may not be possible to form the eccentricity E5 at an inner diameter or an outer diameter of the at least one annular plate 914, 916, the eccentricity E5 may be formed at the radially outer diameter D3-4 or the inner diameter D5 defined by the cartridge 920.

FIG. 9B illustrates a partial sectional side view of a brush seal 900-1, according to yet another embodiment of the present disclosure. The brush seal 900-1 includes an annular plate assembly 902-1 similar to the annular plate assembly 402 explained in relation to FIGS. 5 and 6A. The annular plate assembly 902-1 includes at least one annular plate 914-1, 916-1. The at least one annular plate 914-1, 916-1 may include a first annular plate 914-1 and a second annular plate 916-1 at least partially receiving a bristle pack 908-1 therebetween. The at least one annular plate 914-1 may be interchangeably referred to as the first annular plate 914-1 and the at least one annular plate 916-1 may be interchangeably referred to as the second annular plate 916-1. The bristle pack 908-1 may be similar to the bristle pack 408 explained in relation to FIGS. 5 and 6A. Further, the bristle pack 908-1 includes a plurality of bristles 910-1 similar to the bristles 410 explained in relation to FIGS. 5 and 6A. The plurality of bristles 910-1 define a bristle bore 912-1 having a bristle bore central axis A4-5.

Further, the first annular plate 914-1 defines a first height H1-1 that may be substantially equal to a second height H2-1 defined by the second annular plate 916-1. Moreover, the bristle pack 908-1 defines a third height H3-1, such that the third height H3-1 may be at least two times greater than each of the first and second heights H1-1, H2-1. The first annular plate 914-1 may be coupled to or integral with the second annular plate 916-1. In the illustrated embodiment of FIG. 9B, the first annular plate 914-1 is fixedly coupled to the second annular plate 916-1. In some examples, the first annular plate 914-1, the bristle pack 908-1, and the second annular plate 916-1 may be fixedly coupled to each other by welding. Alternatively, any other joining process, such as, soldering, brazing, and the like may be used for connecting the first annular plate 914-1, the bristle pack 908-1, and the second annular plate 916-1. In other examples, the first annular plate 914-1 and the second annular plate 916-1 may include a single piece design. For example, the first and second annular plates 914-1, 916-1 may together define a C-shaped cross-section.

Further, the brush seal 900-1 includes a cartridge 920-1 coupled to the first and second annular plates 914-1, 916-1. The cartridge 920-1 includes a first portion 922-1 extending axially along the bristle bore central axis A4-5 and circumferentially surrounding the first and second annular plates 914-1, 916-1, such that the first and second annular plates 914-1, 916-1 are radially disposed within the first portion 922-1. Furthermore, the first portion 922-1 may be fixedly coupled to the first annular plate 914-1 and the second annular plate 916-1. The cartridge 920-1 also includes a second portion 924-1. The second portion 924-1 may be fixedly coupled to the second annular plate 916-1. The second portion 924-1 includes a first member 926 extending radially from the first portion 922-1. The second portion 924-1 also includes a second member 928 extending along the bristle bore central axis A4-5 and radially spaced apart from the first portion 922-1. The first and second members 926, 928 are perpendicular to each other.

Further, the second portion 924-1 defines a pocket 930 configured to receive a high pressure fluid. Specifically, the pocket 930 is formed by the second annular plate 916-1, a portion of the first member 926, and the second member 928. The pocket 930 may allow the high pressure fluid to offload a contact force from the bristles 910-1 to the annular plate assembly 902-1. Further, the first portion 922-1 and the second portion 924-1 are disposed such that the cartridge 920-1 includes a substantially C-shaped cross-section. In an example, the cartridge 920-1 may be fixedly coupled to the first and second annular plates 914-1, 916-1 by welding. Alternatively, any other joining process may be used to couple the cartridge 920-1 with the first and second annular plates 914-1, 916-1. The cartridge 920-1 may include a single piece design or various portions of the cartridge 920-1 may be fixedly coupled to each other by a suitable joining process. It should be further noted that the cartridge 920-1 may be manufactured by any manufacturing process, such as, casting or an additive manufacturing process.

Further, in the illustrated embodiment of FIG. 9B, the first portion 922-1 of the cartridge 920-1 defines a radially outer diameter D3-5 and the second portion 924-1 of the cartridge 920-1 defines a radially inner diameter D2-5. In the accompanying FIG. 9B, the radially outer diameter D3-5 and the radially inner diameter D2-5 are annotated as a radius D3-5/2 and a radius D2-5/2, respectively, as only a portion of the brush seal 900-1 is illustrated in FIG. 9B. The radially outer diameter D3-5 and the radially inner diameter D2-5 will be equal to twice the value of the radius D3-5/2 and the radius D2-5/2, respectively.

As illustrated in FIG. 9B, an inner central axis A2-5 defined by the radially inner diameter D2-5 and an outer central axis A3-5 defined by the radially outer diameter D3-5 are spaced apart from each other by an offset O5, such that the radially inner diameter D2-5 and the radially outer diameter D3-5 are eccentric with respect to each other. In some embodiments, the offset O5 between the inner central axis A2-5 and the outer central axis A3-5 is from 0.1 mm to 1 mm for every 1 m of the radially outer diameter D3-5.

In some embodiments, the offset O5 may be defined based on a formation of an eccentricity E6 at the radially outer diameter D3-5 or an inner diameter D6 of the first portion 922-1. In the illustrated embodiment of FIG. 9B, the offset O5 is defined based on the formation of the eccentricity E6 at the radially outer diameter D3-5 of the first portion 922-1. It should be noted that the eccentricity E6 at the radially outer diameter D3-5 of the cartridge 920-1 may be formed by a machining process, without any limitations. For example, the eccentricity E6 may be formed after an assembly of the brush seal 900-1. Alternatively, the offset O5 may be defined based on the formation of the eccentricity E6 at the inner diameter D6 of the first portion 922-1. It should be noted that the details provided related to the formation of the eccentricity E5 on the cartridge 920 of FIG. 9A may be equally applicable to the formation of the eccentricity E6 on the cartridge 920-1, without any limitations.

In some examples, the cartridge 920-1 may be coupled with the seal housing bore 104 (see FIG. 4) instead of being coupled to the annular plate assembly 902-1. For example, the cartridge 920-1 may be coupled with the seal housing 102 (see FIG. 4) by a bolted connection. In such an example, the eccentricity E6 may be formed at the inner diameter D6 of the first portion 922-1.

Figures 10A, 10B:
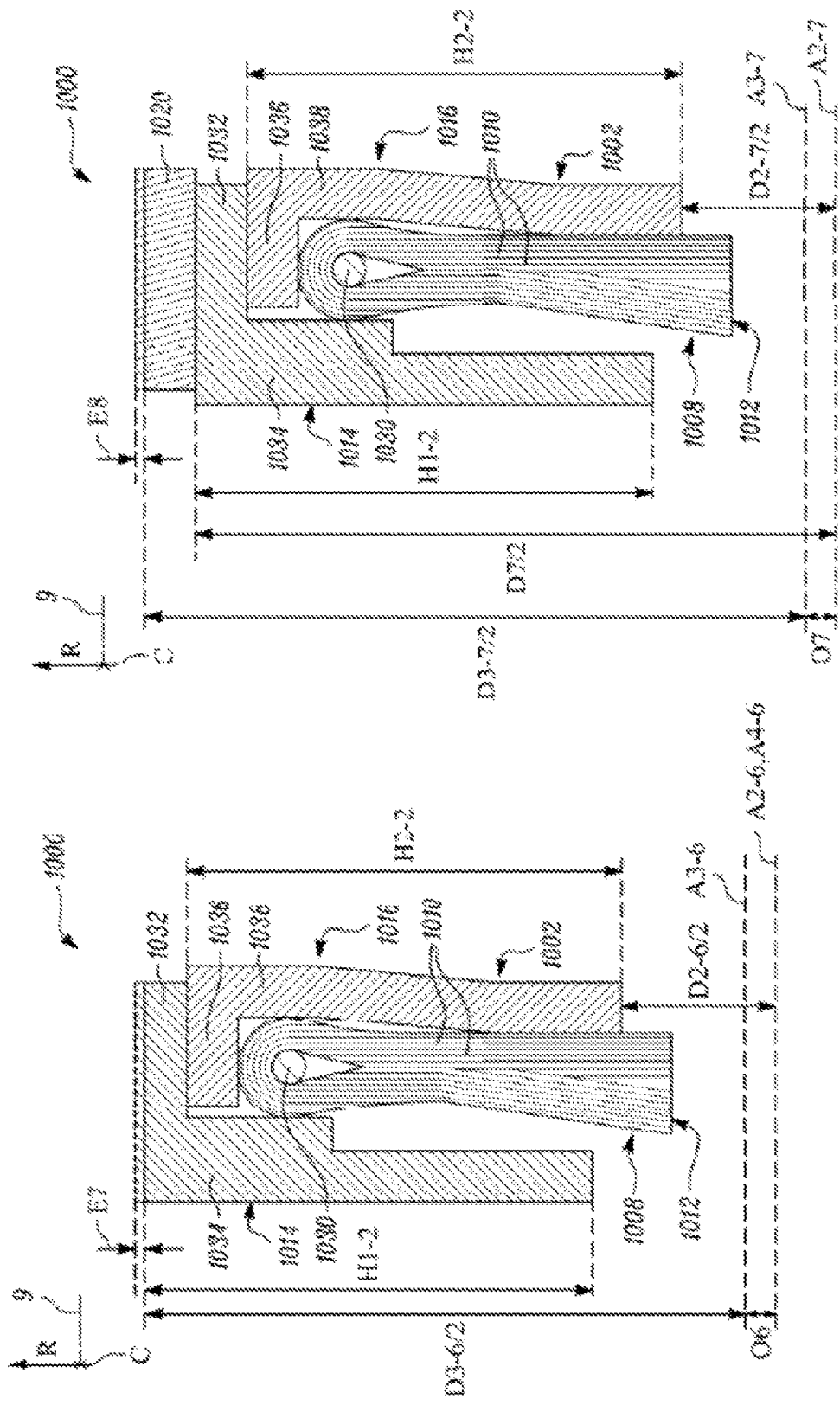
FIG. 10A illustrates a schematic sectional side view of a portion of a brush seal having a spiral-wound ring.
FIG. 10B illustrates a schematic sectional side view of a portion of a brush seal having a spiral-wound ring and a spacer.

FIG. 10A illustrates a partial sectional side view of a brush seal 1000 according to another embodiment of the present disclosure. The brush seal 1000 includes an annular plate assembly 1002 and a bristle pack 1008 coupled to the annular plate assembly 1002. The bristle pack 1008 includes a plurality of bristles 1010. The plurality of bristles 1010 defines a bristle bore 1012 having a bristle bore central axis A4-6.

The annular plate assembly 1002 defines a radially inner diameter D2-6 having an inner central axis A2-6 and a radially outer diameter D3-6 having an outer central axis A3-6. Further, the inner central axis A2-6 and the outer central axis A3-6 are spaced apart from each other by an offset O6, such that the radially inner diameter D2-6 and the radially outer diameter D3-6 are eccentric with respect to each other. In some embodiments, the offset O6 between the inner central axis A2-6 and the outer central axis A3-6 is from 0.1 mm to 1 mm for every 1 m of the radially outer diameter D3-6.

The offset O6 may be defined based on a formation of an eccentricity E7 at the radially outer diameter D3-6 or the radially inner diameter D2-6. In the illustrated example of FIG. 10A, the eccentricity E7 is formed at the radially outer diameter D3-6 of the annular plate assembly 1002. As illustrated in FIG. 10A, the bristle bore central axis A4-6 is aligned with the inner central axis A2-6 of the radially inner diameter D2-6. Specifically, the bristle bore central axis A4-6 is coincident with the inner central axis A2-6. Further, the bristle bore central axis A4-6 is offset from the outer central axis A3-6 of the radially outer diameter D3-6. Specifically, the bristle bore central axis A4-6 and the outer central axis A3-6 are spaced apart from each other by the offset O6.

In some embodiments, the annular plate assembly 1002 includes a spiral-wound ring 1030. Thus, the teachings of the present disclosure may be applied to wound brush seals having a spiral-wound ring. Further, in some embodiments, each of the plurality of bristles 1010 is coupled to the spiral-wound ring 1030. Specifically, a portion of the bristles 1010 may be wound around the spiral-wound ring 1030. The annular plate assembly 1002 may further include a first annular plate 1014 and a second annular plate 1016. The first annular plate 1014 may be interchangeably referred to as at least one first annular plate 1014 and the second annular plate 1016 may be interchangeably referred to as at least one annular plate 1016. The spiral-wound ring 1030 may be disposed between the first annular plate 1014 and the second annular plate 1016. In some embodiments, the first annular plate 1014 defines the radially outer diameter D3-6 and the second annular plate 1016 defines the radially inner diameter D2-6. Further, the first annular plate 1014 includes a stepped design herein.

The first annular plate 1014 includes a first plate member 1032 and a second plate member 1034 that extends radially from the first plate member 1032. The first plate member 1032 defines the radially outer diameter D3-6, such that the eccentricity E7 may be formed at the radially outer diameter D3-6. In the accompanying FIG. 10A, the radially outer diameter D3-6 and the radially inner diameter D2-6 are annotated as a radius D3-6/2 and a radius D2-6/2, respectively, as only a portion of the brush seal 1000 is illustrated in FIG. 10A. The radially outer diameter D3-6 and the radially inner diameter D2-6 will be equal to twice the value of the radius D3-6/2 and the radius D2-6/2, respectively. It should be noted that the eccentricity E7 on the first annular plate 1014 may be formed by a machining process, without any limitations. For example, the eccentricity E7 may be formed after an assembly of the brush seal 1000.

Further, the second annular plate 1016 includes a third plate member 1036 and a fourth plate member 1038 that extends radially from the third plate member 1036. The first plate member 1032 may be coupled to the third plate member 1036, such that the third plate member 1036 may be radially disposed within the first plate member 1032. The second plate member 1034 may be axially spaced apart from the fourth plate member 1038 such that the bristle pack 1008 may be received in a gap between the second plate member 1034 and the fourth plate member 1038. The first annular plate 1014 defines a first height H1-2 that may be lesser than a second height H2-2 defined by the second annular plate 1016.

Further, the radially inner diameter D2-6 may be defined by the second annular plate 1016. In some embodiments, wherein the first height H1-2 may be substantially equal to the second height H2-2, the radially inner diameter D2-6 may be defined by the first and second annular plates 1014, 1016. Moreover, in some embodiments, the eccentricity E7 may be formed at the radially inner diameter D2-6 instead of being formed at the radially outer diameter D3-6, without any limitations. It should be noted that the first and second annular plates 1014, 1016 may be manufactured by any manufacturing process, such as, casting or an additive manufacturing process.

FIG. 10B illustrates a partial sectional side view of the brush seal 1000. As illustrated in FIG. 10B, the annular plate assembly 1002 includes the first annular plate 1014, the second annular plate 1016, and a spacer 1020 circumferentially surrounding the at least one annular plate 1014, 1016. The spacer 1020 may be similar to the spacer 720 explained in relation to FIGS. 7 and 8A. The spacer 1020 may be fixedly coupled to the first annular plate 1014. Specifically, the spacer 1020 may be fixedly coupled to the first plate member 1032 of the first annular plate 1014. In an example, the spacer 1020 may be fixedly coupled to the first annular plate 1014 by welding or using mechanical fasteners, such as, bolts, screws, pins, and the like. Alternatively, any other joining process may be used to couple the spacer 1020 with the first and second annular plates 1014, 1016.

The spacer 1020 may define a radially outer diameter D3-7 and the second annular plate 1016 may define a radially inner diameter D2-7. In the accompanying FIG. 10B, the radially outer diameter D3-7 and the radially inner diameter D2-7 are annotated as a radius D3-7/2 and a radius D2-7/2, respectively, as only a portion of the brush seal 1000 is illustrated in FIG. 10B. The radially outer diameter D3-7 and the radially inner diameter D2-7 will be equal to twice the value of the radius D3-7/2 and the radius D2-7/2, respectively. As illustrated in FIG. 10B, an inner central axis A2-7 defined by the radially inner diameter D2-7 and an outer central axis A3-7 defined by the radially outer diameter D3-7 are spaced apart from each other by an offset O7, such that the radially inner diameter D2-7 and the radially outer diameter D3-7 are eccentric with respect to each other. In some embodiments, the offset O7 between the inner central axis A2-7 and the outer central axis A3-7 is from 0.1 mm to 1 mm for every 1 m of the radially outer diameter D3-7.

Further, the offset O7 may be defined based on a formation of an eccentricity E8 at the radially outer diameter D3-7 or an inner diameter D7 of the spacer 1020. In the illustrated embodiment of FIG. 10B, the offset O7 is defined based on the formation of the eccentricity E8 at the radially outer diameter D3-7 of the spacer 1020. It should be noted that the eccentricity E8 at the radially outer diameter D3-7 of the spacer 1020 may be formed by a machining process, without any limitations. For example, the eccentricity E8 may be formed after an assembly of the brush seal 1000. It should be further noted that the spacer 1020 may be manufactured by any manufacturing process, such as, casting or an additive manufacturing process. In another embodiment, the eccentricity E8 may be formed at the inner diameter D7 defined by the spacer 1020.

Referring to FIGS. 4 to 10B, the brush seals 400, 600, 700, 900, 900-1, 1000 described herein may provide a simple and cost-effective technique of eliminating any eccentricity that may be present between the seal housing bore 104 and the component outer diameter D1. The eccentricity, that may be present due to manufacturing tolerances and assembly tolerances, including bearing tolerances, may be eliminated based on an alignment of the bristle bore central axis A4-1, A4-2, A4-4, A4-5, A4-6, and the component axis A1.

Figure 11:
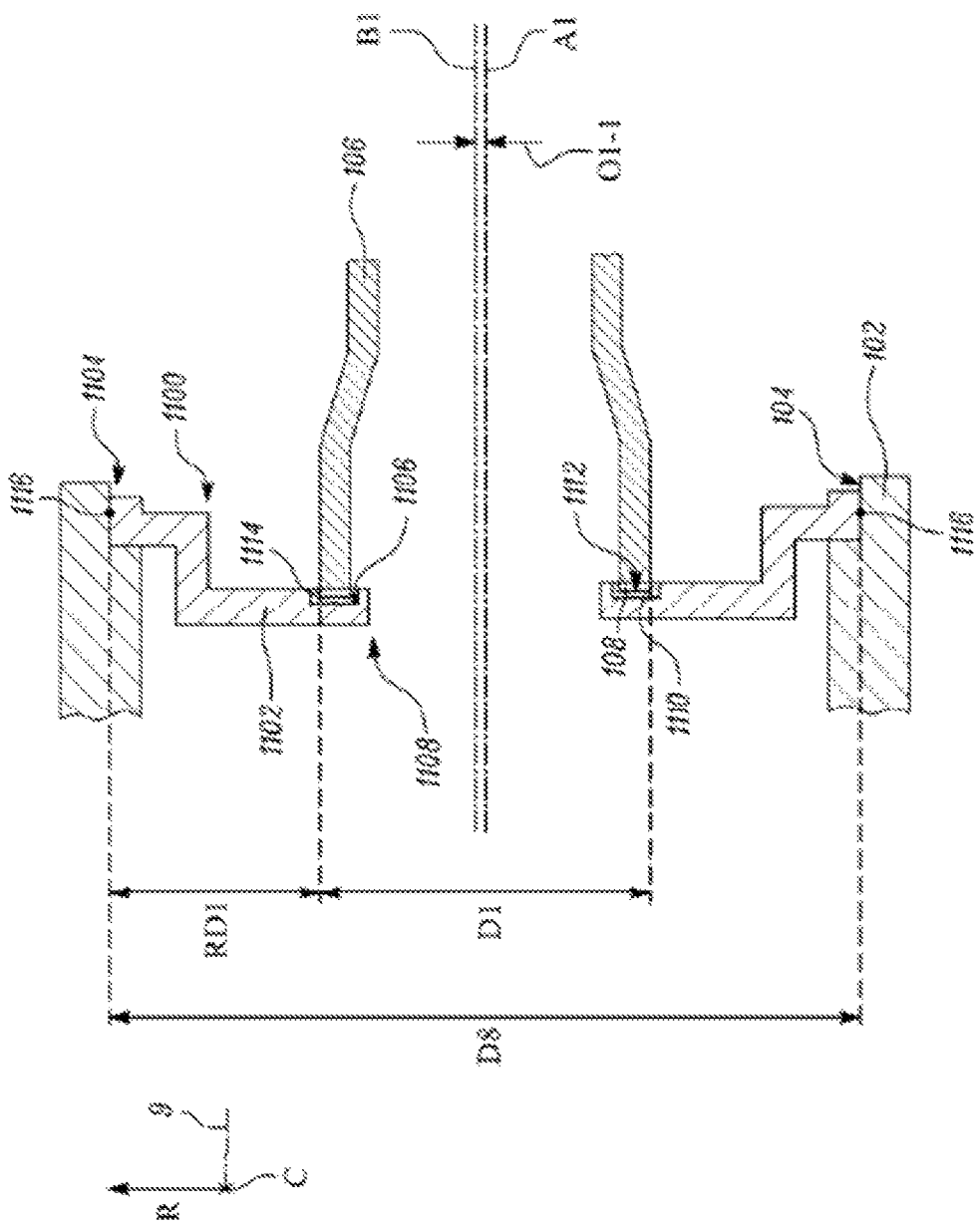
FIG. 11 illustrates a set-up for determining an eccentricity between a seal housing bore and a component outer diameter of the rotating component using a ring.

Referring now to FIG. 11, a schematic sectional view of a set-up 1100 for determining the eccentricity is illustrated. The set-up 1100 includes a ring 1102. The ring 1102 may be removably disposed between the seal housing 102 and the rotating component 106. The ring 1102 may be installed at a location where the brush seal 400, 600, 700, 900, 900-1, 1000 (see FIGS. 4 to 10B) would be installed. The ring 1102 includes a stepped design herein. A radially outer end 1104 of the ring 1102 may contact the seal housing 102. The ring 1102 may include an annular pocket 1106. The annular pocket 1106 may be defined proximate to a radially inner end 1108 of the ring 1102. The annular pocket 1106 may receive a surface replicating compound 1110. The surface replicating compound 1110 may include, for example, Replicast®. In various examples, the surface replicating compound 1110 may be replaced by soft compounds or materials that are designed to witness a contact through plasticity. Further, a shape and a size of the ring 1102 may be obtained such that that the annular pocket 1106 may axially align with the rotating component 106 after the rotating component 106 is installed.

When the rotating component 106 is installed, an end surface 108 of the rotating component 106 may impinge on the surface replicating compound 1110 such that an indentation profile 1112 may be formed on the surface replicating compound 1110. Subsequently, the rotating component 106 and the ring 1102 may be removed from the seal housing 102. A position of the indentation profile 1112 made by the end surface 108 of the rotating component 106 is measured. Specifically, a radial distance RD1 between an outer diameter D8 of the ring 1102 and a radially outboard edge 1114 of the indentation profile 1112 may be measured at a plurality of circumferential positions 1116. The radial distance RD1 may be used to determine a magnitude and a direction of the eccentricity between the seal housing bore 104 and the component outer diameter D1. Further, a suitable brush seal 400, 600, 700, 900, 900-1, 1000 from a number of pre-manufactured brush seals may be chosen to match the eccentricity as determined using the set-up 1100.

Figure 12:
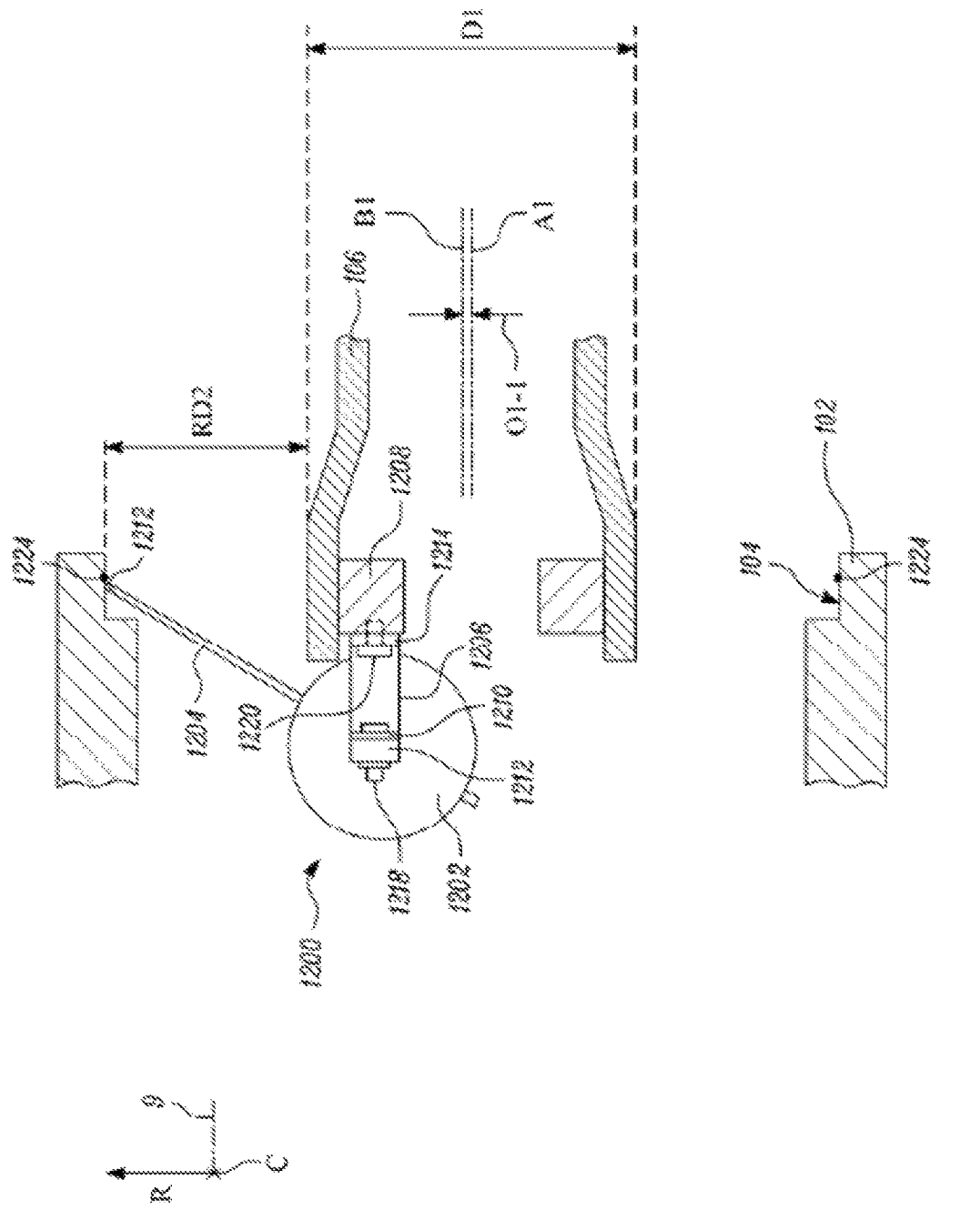
FIG. 12 illustrates a set-up for determining the eccentricity between the seal housing bore and the component outer diameter of the rotating component using a dial gauge.

Referring now to FIG. 12, a schematic sectional view of another set-up 1200 for determining the eccentricity is illustrated. The set-up 1200 includes a dial gauge 1202. The dial gauge 1202 includes a plunger 1204. The dial gauge 1202 may include a digital dial gauge that may be equipped with wireless transmission of measurement data or may be equipped with a means of digital data storage. Further, the dial gauge 1202 may be coupled with the rotating component 106 via a bracket 1206 and a clamp 1208. The dial gauge 1202 may be removably coupled with the bracket

1206. The bracket 1206 may include a C-shaped structure. A first member 1210 of the bracket 1206 may be coupled to a dial gauge housing attachment port 1212 via a first mechanical fastener 1218. Further, a second member 1214 of the bracket 1206 may be coupled to the clamp 1208 by a second mechanical fastener 1220. The clamp 1208 may be removably coupled to the rotating component 106. The clamp 1208 may have an annular structure that may be radially disposed within the rotating component 106. It should be noted that the bracket 1206 and the clamp 1208 may be replaced by any other attachment structure that may allow removable coupling of the dial gauge 1202 with the rotating component 106.

When the rotating component 106 is installed, a tip 1222 of the plunger 1204 may contact the seal housing bore 104. Further, the rotating component 106 may be manually rotated by at least one full revolution and readings of the dial gauge 1202 may be recorded at a plurality of circumferential positions 1224. It should be noted that the readings of the dial gauge 1202 may be corrected to account for an angle of the plunger 1204 from the radial direction R. From the readings of the dial gauge 1202, a radial distance RD2 between the component outer diameter D1 and the seal housing 102 may be obtained at the plurality of circumferential positions 1224. The radial distance RD2 may be used to determine a magnitude and a direction of the eccentricity between the seal housing bore 104 and the component outer diameter D1. Further, a suitable brush seal 400, 600, 700, 900, 900-1, 1000 (see FIGS. 4 to 10B) from a number of pre-manufactured brush seals may be chosen to match the eccentricity as determined using the set-up 1200.

Figure 13:
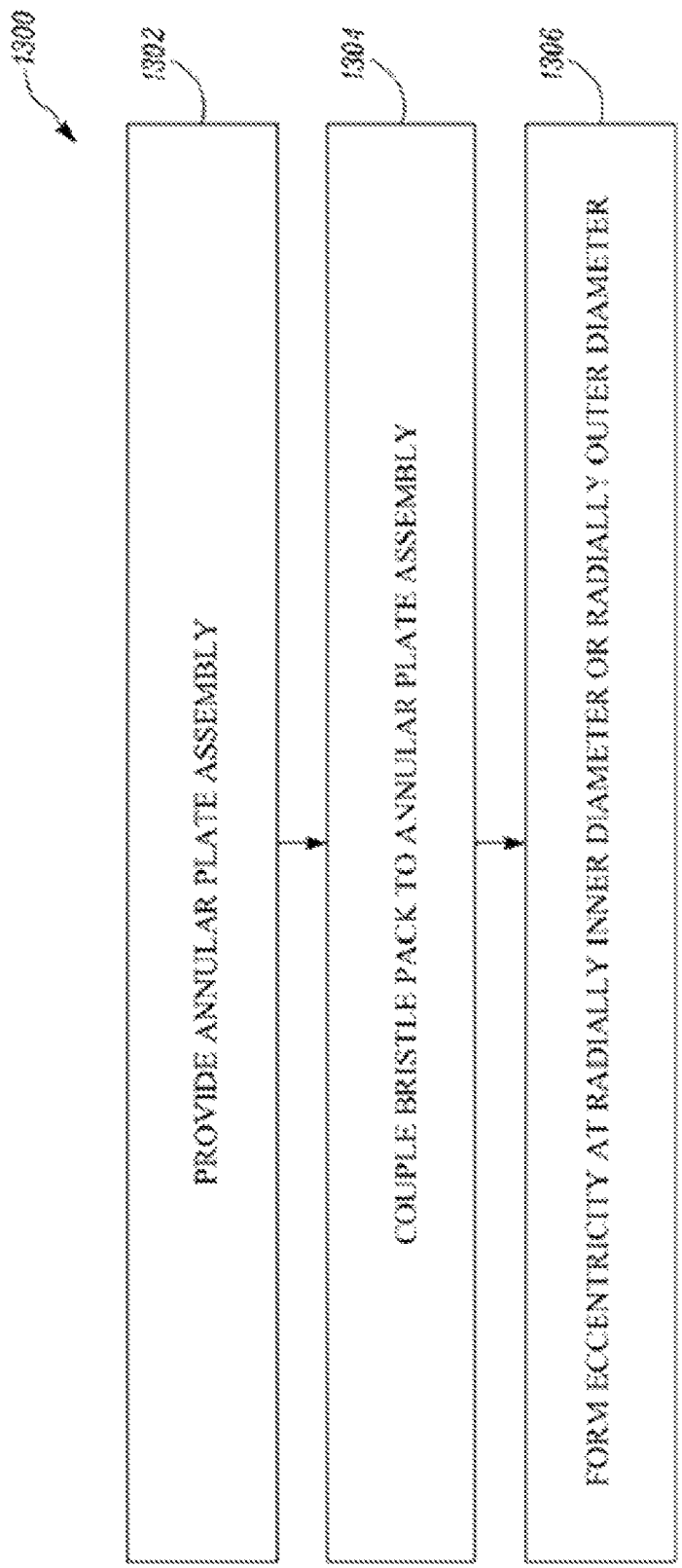
FIG. 13 is a flowchart of a method of manufacturing the brush seal according to an embodiment of the present disclosure.

FIG. 13 illustrates a flowchart for a method 1300 of manufacturing the brush seal 400. For exemplary purposes, the method 1300 will be explained in reference to the brush seal 400 explained in relation to FIGS. 5 and 6A. At step 1302, the annular plate assembly 402 is provided. At step 1304, the bristle pack 408 is coupled to the annular plate assembly 402. At step 1306, the eccentricity E1 is formed at the radially inner diameter D2 or the radially outer diameter D3, such that the radially inner diameter D2 and the radially outer diameter D3 are eccentric with respect to each other.

Figure 14:
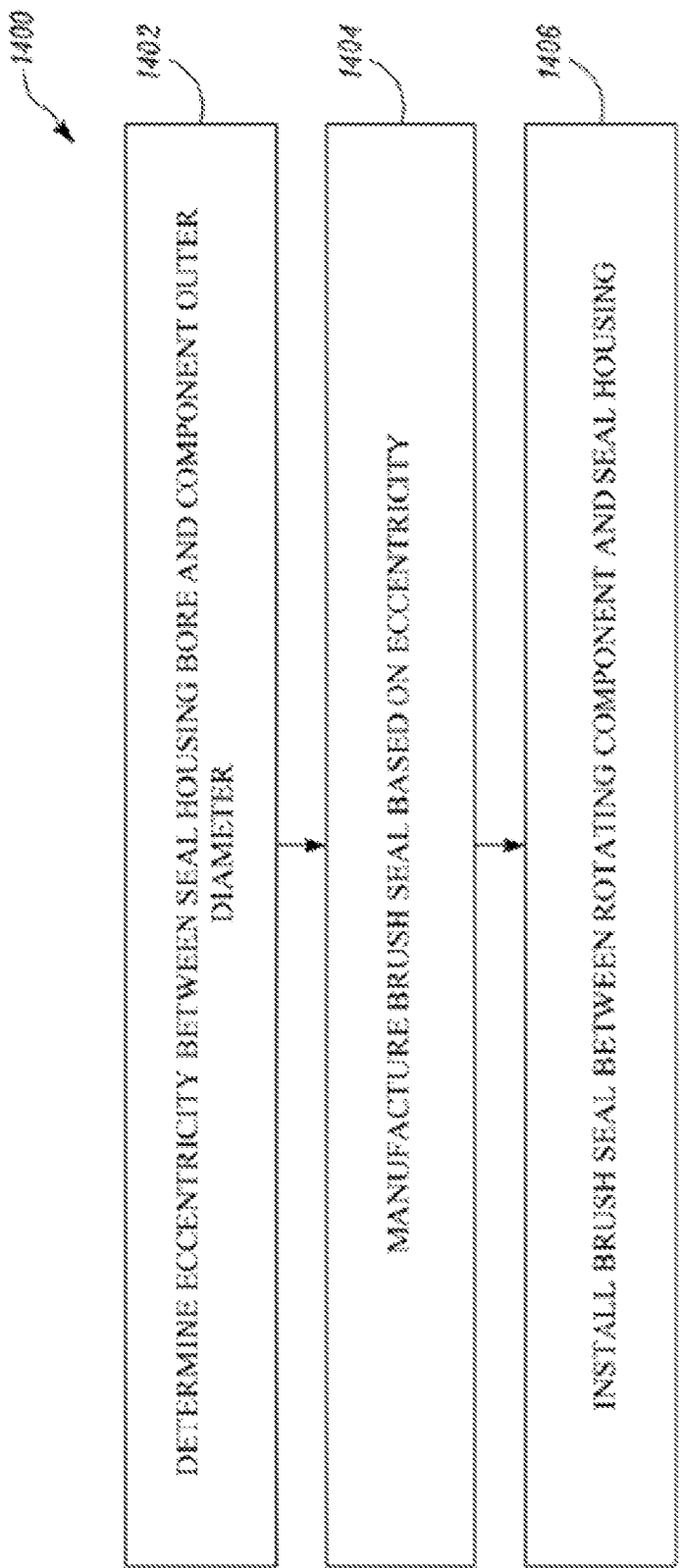
FIG. 14 is a flowchart of a method of installing the brush seal in the gas turbine engine according to an embodiment of the present disclosure.

FIG. 14 illustrates a flowchart for a method 1400 of installing the brush seal 400 in the gas turbine engine 10. For exemplary purposes, the method 1400 will be explained in reference to the brush seal 400 explained in relation to FIGS. 5 and 6A. At step 1402, the eccentricity between the seal housing bore 104 and the component outer diameter D1 is determined. At step 1404, the brush seal 400 is manufactured based on the eccentricity. At step 1406, the brush seal 400 is installed between the rotating component 106 and the seal housing 102.

In some embodiments, the eccentricity between the seal housing bore 104 and the component outer diameter D1 may be determined by coupling the ring 1102 to the seal housing 102. The ring 1102 may include the annular pocket 1106. Further, the surface replicating compound 1110 may be provided within the annular pocket 1106. Furthermore, the rotating component 106 may be impinged on the surface replicating compound 1110, such that the indentation profile 1112 may be formed on the surface replicating compound 1110. Moreover, the radial distance RD1 between the outer diameter D8 of the ring 1102 and the radially outboard edge 1114 of the indentation profile 1112 may be measured at the plurality of circumferential positions 1116. Further, the eccentricity between the seal housing bore 104 and the component outer diameter D1 may be determined based on the radial distance RD1 measured at the plurality of circumferential positions 1116.

In some embodiments, the eccentricity between the seal housing bore 104 and the component outer diameter D1 may be determined by coupling the dial gauge 1202 to the rotating component 106. Further, the tip 1222 of the dial gauge 1202 may be engaged with the seal housing 102. Furthermore, the radial distance RD2 between the component outer diameter D1 and the seal housing 102 may be measured at the plurality of circumferential positions 1224. Moreover, the eccentricity between the seal housing bore 104 and the component outer diameter D1 may be determined based on the radial distance RD2 measured at the plurality of circumferential positions 1224. The method 1400 of installing the brush seal 400 as described herein is simple and time-efficient.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:
1. A brush seal comprising:
   an annular plate assembly defining a radially inner diameter having an inner central axis and a radially outer diameter having an outer central axis, wherein the inner central axis and the outer central axis are spaced apart from each other by an offset, such that the radially inner diameter and the radially outer diameter are eccentric with respect to each other; and
   a bristle pack coupled to the annular plate assembly, the bristle pack comprising a plurality of bristles, the plurality of bristles defining a bristle bore having a bristle bore central axis, wherein:
   the bristle bore central axis is aligned with the inner central axis of the radially inner diameter;
   the bristle bore central axis is offset from the outer central axis of the radially outer diameter; and
   the brush seal is disposed around a rotating component, such that the bristle bore central axis is aligned with a component axis defined by the rotating component and the bristle pack engages with the rotating component.

2. The brush seal of claim 1, wherein the annular plate assembly comprises at least one annular plate defining the radially inner diameter and the radially outer diameter.

3. The brush seal of claim 2, wherein the at least one annular plate comprises a first annular plate and a second annular plate at least partially receiving the bristle pack therebetween.

4. The brush seal of claim 3, wherein the second annular plate defines a pocket configured to receive a high pressure fluid.

5. The brush seal of claim 3, wherein the first annular plate is coupled to or integral with the second annular plate.

6. The brush seal of claim 1, wherein the annular plate assembly comprises a spiral-wound ring, and wherein each of the plurality of bristles is coupled to the spiral-wound ring.

7. The brush seal of claim 6, wherein the annular plate assembly further comprises a first annular plate and a second annular plate, wherein the spiral-wound ring is disposed between the first annular plate and the second annular plate, and wherein the first annular plate defines the radially outer diameter and the second annular plate defines the radially inner diameter.

8. The brush seal of claim 1, wherein the annular plate assembly comprises at least one annular plate and a spacer circumferentially surrounding the at least one annular plate, wherein the spacer is fixedly coupled to the at least one annular plate, and wherein the spacer defines the radially outer diameter and the at least one annular plate defines the radially inner diameter.

9. The brush seal of claim 1, wherein the annular plate assembly comprises at least one annular plate and a cartridge, the cartridge comprising a first portion extending axially along the bristle bore central axis and circumferentially surrounding the at least one annular plate and a second portion extending radially from the first portion, wherein the first portion of the cartridge defines the radially outer diameter and the at least one annular plate of the cartridge or the second portion of the cartridge defines the radially inner diameter.

10. The brush seal of claim 9, wherein the second portion defines a pocket configured to receive a high pressure fluid.

11. The brush seal of claim 1, wherein the offset between the inner central axis and the outer central axis is from 0.1 mm to 1 mm for every 1 metre of the radially outer diameter.

12. A gas turbine engine comprising:
a seal housing defining a seal housing bore;
a rotating component at least partially received within the seal housing bore and defining a component outer diameter radially spaced apart from the seal housing; and
the brush seal of claim 1, wherein the brush seal is received within the seal housing bore and radially disposed between the component outer diameter of the rotating component and the seal housing.

13. A method of installing a brush seal of claim 1, in a gas turbine engine, the method comprising the steps of:
determining an eccentricity between the seal housing bore and the component outer diameter of the gas turbine engine;
manufacturing the brush seal of based on the eccentricity; and
installing the brush seal between a rotating component and a seal housing of the gas turbine engine.

14. The method of claim 13, wherein determining the eccentricity further comprises:
coupling a ring to the seal housing, the ring comprising an annular pocket;
providing a surface replicating compound within the annular pocket;
impinging the rotating component on the surface replicating compound, such that an indentation profile is formed on the surface replicating compound;
measuring a radial distance between an outer diameter of the ring and a radially outboard edge of the indentation profile at a plurality of circumferential positions; and
determining the eccentricity between the seal housing bore and the component outer diameter based on the radial distance measured at the plurality of circumferential positions.

15. The method of claim 13, wherein determining the eccentricity further comprises:
coupling a dial gauge to the rotating component;
engaging a tip of the dial gauge with the seal housing;
measuring a radial distance between the component outer diameter and the seal housing at a plurality of circumferential positions; and
determining the eccentricity between the seal housing bore and the component outer diameter based on the radial distance measured at the plurality of circumferential positions.

* * * * *